US010742045B2

(12) United States Patent
Jung et al.

(10) Patent No.: US 10,742,045 B2
(45) Date of Patent: Aug. 11, 2020

(54) CHARGING DEVICE

(71) Applicant: LG ELECTRONICS INC., Seoul (KR)

(72) Inventors: Geunyong Jung, Seoul (KR); Seongho Park, Seoul (KR); Sejong Park, Seoul (KR); Jonghyun Seo, Seoul (KR); Jinwoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 15/585,252

(22) Filed: May 3, 2017

(65) Prior Publication Data

US 2017/0324259 A1   Nov. 9, 2017

(30) Foreign Application Priority Data

May 3, 2016   (KR) .................. 10-2016-0054913
May 3, 2016   (KR) .................. 10-2016-0054914

(51) Int. Cl.
*H02J 7/00*   (2006.01)
*A47L 9/28*   (2006.01)

(52) U.S. Cl.
CPC .......... *H02J 7/0027* (2013.01); *A47L 9/2873* (2013.01); *A47L 9/2889* (2013.01); *H02J 7/0045* (2013.01); *A47L 2201/022* (2013.01)

(58) Field of Classification Search
CPC ..... H02J 7/0027; H02J 7/0045; A47L 9/2873; A47L 9/2889
USPC .......................... 320/107, 112, 113, 114, 115
See application file for complete search history.

(56) References Cited

U.S. PATENT DOCUMENTS

| | | | |
|---|---|---|---|
| 6,346,793 B1 * | 2/2002 | Shibata ................ | H02J 7/0042 320/107 |
| 9,329,634 B1 | 5/2016 | Ashcraft et al. | |
| 2003/0085686 A1 * | 5/2003 | Haga ..................... | H02J 7/0045 320/112 |
| 2007/0247110 A1 * | 10/2007 | Kaji ...................... | H02J 7/0042 320/107 |
| 2010/0265652 A1 | 10/2010 | Agata et al. | |
| 2014/0199876 A1 | 7/2014 | Kato et al. | |

FOREIGN PATENT DOCUMENTS

| | | |
|---|---|---|
| JP | 07194016 | 7/1995 |
| JP | 2010-158126 | 7/2010 |
| KR | 1997-0004105 | 4/1997 |
| KR | 200172349 | 12/1999 |

(Continued)

OTHER PUBLICATIONS

Partial Supplementary European Search Report in European Application No. 17792861.1, dated Nov. 15, 2019, 14 pages.

*Primary Examiner* — Edward Tso
*Assistant Examiner* — Aaron Piggush
(74) *Attorney, Agent, or Firm* — Fish & Richardson P.C.

(57) ABSTRACT

A charging device is provided. The charging device includes an output terminal unit connected to an input terminal unit of a battery pack. The output terminal unit includes a terminal body including an output terminal connected to the input terminal unit and a terminal cover which covers the output terminal before the input terminal unit of the battery pack is connected to the output terminal unit and through which the output terminal passes while the input terminal unit of the battery pack is connected to the output terminal unit.

18 Claims, 24 Drawing Sheets

(56) References Cited

FOREIGN PATENT DOCUMENTS

| | | |
|---|---|---|
| KR | 10-2015-0047095 | 5/2015 |
| RU | 2474020 | 1/2013 |
| WO | WO2013039515 | 3/2013 |
| WO | WO2013046671 | 4/2013 |

* cited by examiner

CHARGING DEVICE

CROSS-REFERENCE TO RELATED APPLICATIONS

The present application claims priority under 35 U.S.C. 119 and 35 U.S.C. 365 to Korean Patent Application Nos. 10-2016-0054913 and 10-2016-0054914, filed on May 3, 2016, which are hereby incorporated by reference in their entireties.

BACKGROUND

The present disclosure relates to a charging device.

In general, home appliances such as a cleaner use a battery for user convenience and utilize wireless technologies to perform cleaning by using only power of a battery for a certain time without connection to a power source.

However, due to limitations in battery capacity and weight, batteries that can be installed in home appliances are limited. In addition, there are limitations in that the home appliances wirelessly driven by using batteries are lower in output than electric home appliances to which power is always supplied.

Recently, with advances in battery technology, high voltage batteries which are charged with a high peak voltage exceeding about 42.4 V have been developed.

As the prior art document related to a charging device for a battery, there is Korean Utility Model Application No. 20-2004-0023140, entitled "Charging Station for Robot Cleaner."

According to the above-mentioned prior art document, since a charging terminal is exposed to the outside, the robot cleaner is configured so that one side thereof comes into contact with the charging terminal. However, in such a charging structure, since the charging terminal is exposed to the outside to increase the risk of electric shock, it is difficult to use the charging structure for charging a battery at a high voltage.

SUMMARY

Embodiments provide a charging device that prevents an output terminal of a battery pack from being exposed to the outside in a state in which the battery pack is separated.

Embodiments also provide a charging device that blocks the supply of power to an output terminal in a state in which the battery pack is separated.

Embodiments also provide a charging device in which a battery is chargeable with a high voltage.

In one embodiment, a charging device includes: an output terminal unit connected to an input terminal unit of a battery pack, wherein the output terminal unit includes: a terminal body including an output terminal connected to the input terminal unit; and a terminal cover which covers the output terminal before the input terminal unit of the battery pack is connected to the output terminal unit and through which the output terminal passes while the input terminal unit of the battery pack is connected to the output terminal unit, wherein a rib penetration part through which a pressing rib extending from the battery pack passes is defined in the terminal cover, the output terminal unit further includes a lever coupled to the terminal cover and selectively hooked with the terminal body, and the lever is rotated by the pressing rib passing through the rib penetration part while the input terminal unit of the battery pack is connected to the output terminal unit so that the hooked state of the lever with respect to the terminal body is released.

In another embodiment, a charging device includes: an output terminal unit connected to an input terminal unit of a battery pack; and a micro switch applying power to the output terminal unit, wherein the output terminal unit includes: a terminal body including an output terminal connected to the input terminal unit; a terminal cover which covers the output terminal before the input terminal unit of the battery pack is connected to the output terminal unit and through which the output terminal passes while the input terminal unit of the battery pack is connected to the output terminal unit; and a lever rotatably connected to the terminal cover, wherein a rib penetration part through which a pressing rib extending from the battery pack passes is defined in the terminal cover, and the lever is rotated by the pressing rib passing through the rib penetration part to press the micro switch, thereby turning on the micro switch.

In further another embodiment, a charging device includes: an output terminal unit connected to an input terminal unit of a battery pack, wherein the output terminal unit includes: a terminal cover having a terminal penetration part; a terminal body including a frame to which the output terminal passing through the terminal penetration part is fixed; and a moving mechanism moving by the battery pack while the battery pack is mounted to move the terminal body so that the output terminal passes through the terminal penetration part to selectively protrude to the outside of the terminal cover, wherein the moving mechanism includes: a lever connected to the frame; and a link pressed by the battery pack to operate the lever, wherein the charging device further includes a fixing unit including a link support part guiding vertical movement of the link and a lever fixing part to which the lever is rotatably coupled.

The details of one or more embodiments are set forth in the accompanying drawings and the description below. Other features will be apparent from the description and drawings, and from the claims.

DETAILED DESCRIPTION OF THE EMBODIMENTS

Figure 1:
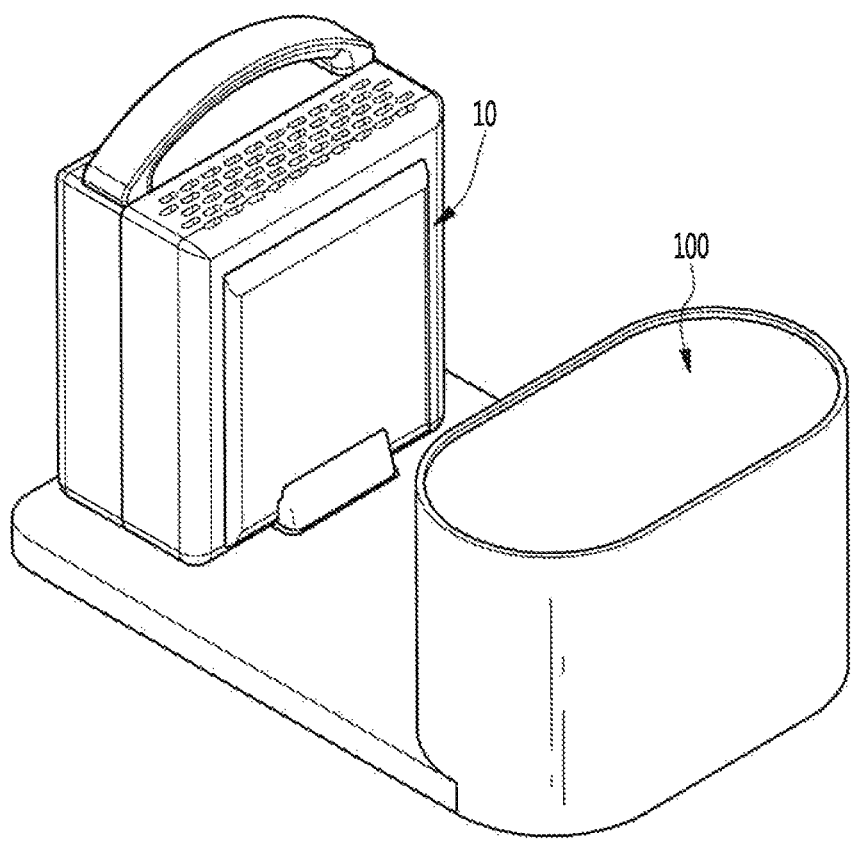
FIG. 1 is a perspective view of a charging device according to an embodiment.

Exemplary embodiments of the present disclosure will be described below in more detail with reference to the accompanying drawings. It is noted that the same or similar components in the drawings are designated by the same reference numerals as far as possible even if they are shown in different drawings.

In the description of the elements of the present disclosure, the terms "first", "second", "A", "B", "(a)", and "(b)" may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

Figure 2:
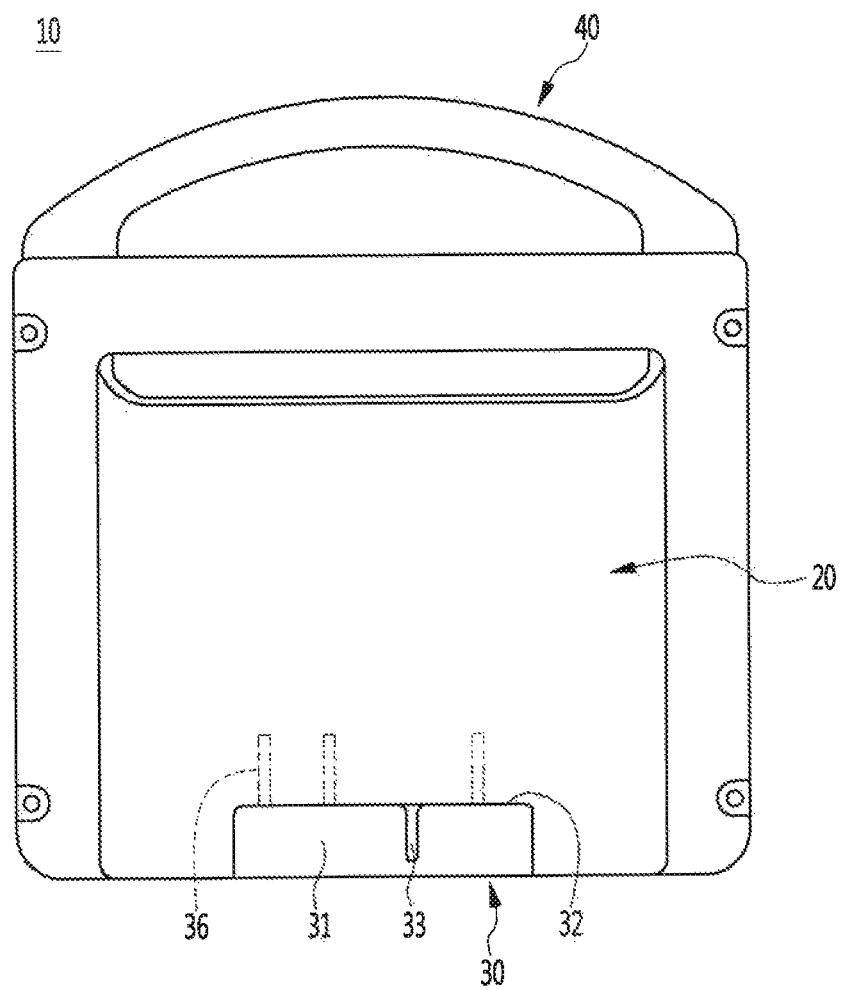
FIGS. 2 and 3 are views illustrating a battery pack according to an embodiment.
Figure 3:
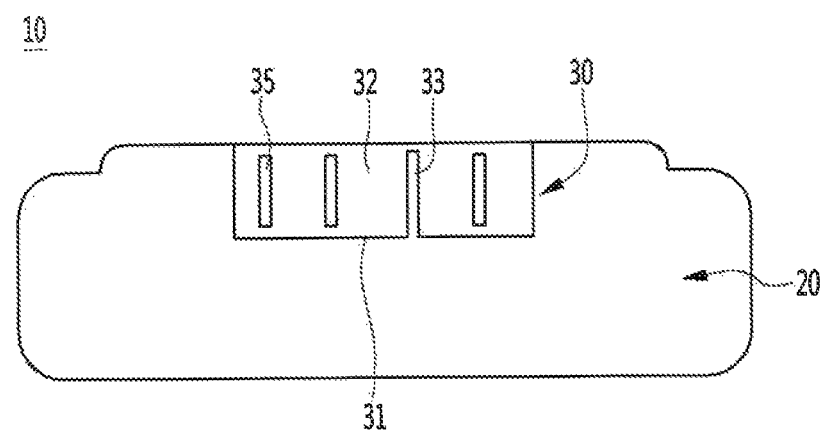
Figure 4:
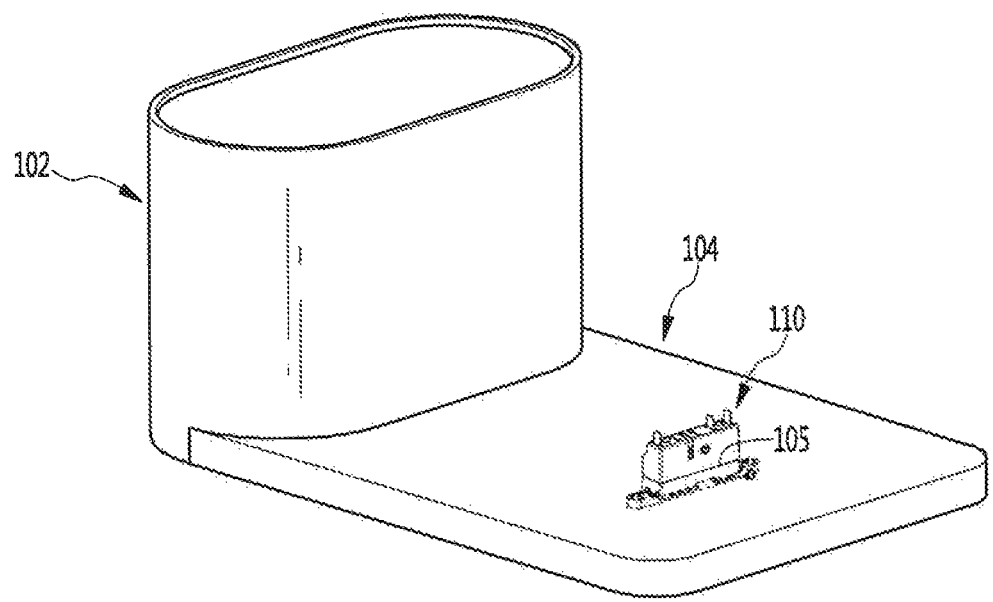
FIG. 4 is a perspective view of the charging device according to an embodiment.

FIG. 1 is a perspective view of a charging device according to an embodiment, FIGS. 2 and 3 are views illustrating a battery pack according to an embodiment, and FIG. 4 is a perspective view of the charging device according to an embodiment.

Referring to FIGS. 1 to 4, a charging device 100 according to an embodiment may charge a battery pack 10 for supplying power to a home appliance.

The battery pack 10 may be detachably mounted on the home appliance. In a state in which the battery pack 10 is separated from the home appliance, when the battery pack 10 is mounted on the charging device 100, the battery pack 10 may be charged.

The battery pack 10 includes a battery unit 20 in which a battery is accommodated and an input terminal unit 30 connecting the battery unit 20 to the charging device 100 to supply power to the battery unit 20.

In the battery unit 20, a plurality of batteries may be connected in series or parallel to each other according to capacity of the battery unit 20. The battery unit 20 may include a control circuit that controls charging/discharging of the plurality of batteries. The control circuit may include, for example, a circuit for blocking the supply of the power when being fully charged.

The input terminal unit 30 may be disposed on one side of the battery pack 10. For example, the input terminal unit 30 may be disposed on a lower portion of the battery pack 10.

The input terminal unit 30 may have a recessed space that is recessed inward from at least one surface of the battery unit 20 by a predetermined depth. For example, the recessed space may be defined by a first recessed surface 31 that is recessed from one surface of the battery unit 20 by a predetermined depth and a second recessed surface 32 that is recessed from a bottom surface of the battery unit 20 by a predetermined depth.

The input terminal unit 30 may further include a pressing rib 33 extending from the first recessed surface 31. Here, the pressing rib 33 may have one edge extending to come into contact with the second recessed surface 32.

In other aspect, the pressing rib 33 may extend downward from the second recessed surface 32. The pressing rib 33 may have one edge coming into contact with the first recessed surface 31.

The input terminal unit 30 may further include a plurality of input terminals 36 connected to the battery unit 20. The plurality of input terminals 36 may be disposed in the battery unit 20. The charging device 100 may have a plurality of terminal insertion holes 35 on the second recessed surface 32 so that output terminals 122 that will be described later are inserted.

The pressing rib 33 may be disposed at a central portion of the input terminal unit 30, and the plurality of terminal insertion holes 35 may be defined in both sides with respect to the pressing rib 33.

In this embodiment, although two terminal insertion holes 35 are defined at a left side of the pressing rib 33, and one terminal insertion hole 35 is defined at a right side of the pressing rib 33 in FIG. 3, the embodiment is not limited thereto. For example, the terminal insertion holes 35 may be symmetrically defined in both sides.

The battery pack 10 may further include a handle 40 disposed at one side of the battery unit 20. For example, the handle 40 may be disposed above the battery unit 20. Thus, the battery pack 10 may be mounted on the charging device 100 so that a user grasps the handle 40 disposed on an upper portion of the battery pack 10, and the input terminal unit 30 disposed on a lower portion of the battery pack 10 is connected to an output terminal unit 110 that will be described later.

The charging device 100 may further include a holding unit 104 for mounting the battery pack 10. The charging device 100 may further include a charging station body 102 disposed on one side of the holding unit 104.

A plurality of power source units may be disposed in the charging station body 102. For example, each of the plurality of power source units may include at least one of a transformer, a rectifier, and a power circuit breaker.

The battery pack 10 may be seated on the holding unit 104. For example, a bottom surface of the battery pack 10 may be seated on a top surface of the holding unit 104.

The output terminal unit 110 to which the input terminal unit 30 is electrically connected may be disposed on one surface of the holding unit 104.

Although the output terminal unit 110 is disposed on the holding unit 104 in this embodiment, the embodiment is not limited thereto. For example, the output terminal unit 110 may be disposed on the charging station body 102.

Figure 5:
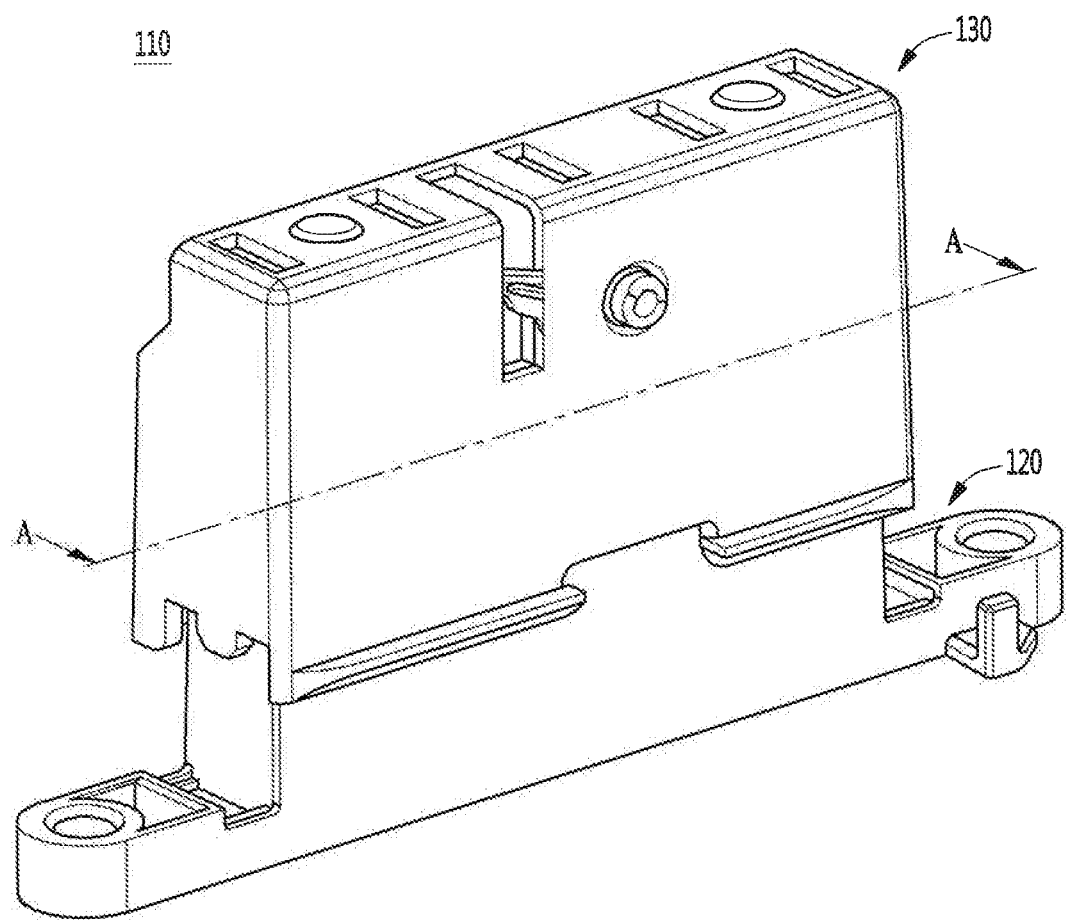
FIG. 5 is a perspective view of an output terminal unit according to an embodiment.
Figure 6:
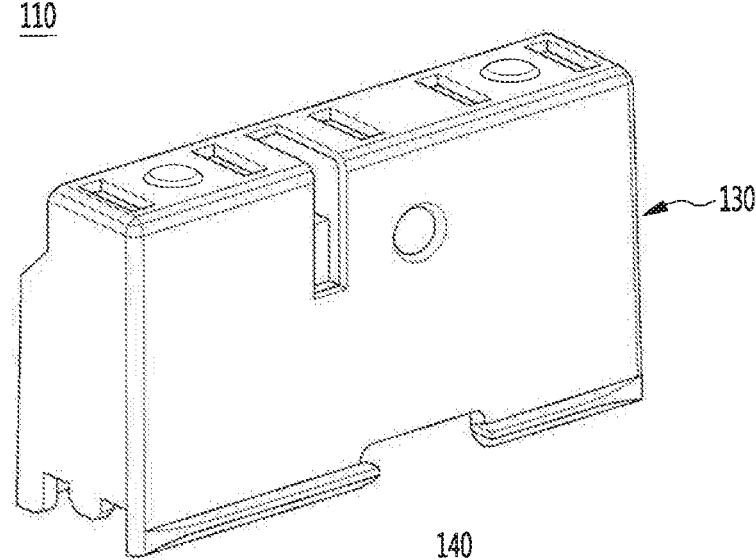
FIG. 6 is an exploded perspective view of the output terminal unit according to an embodiment.
Figure 6:
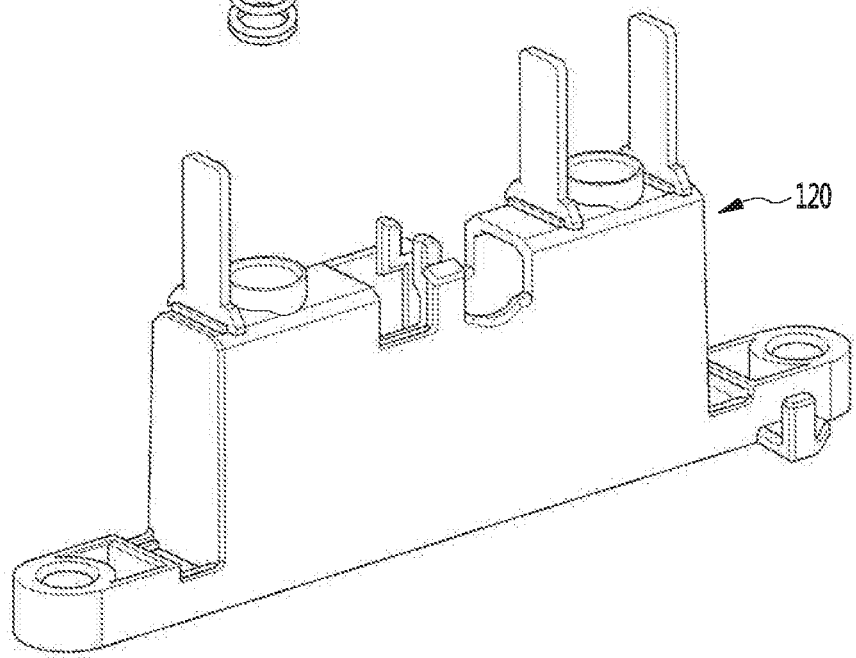
Figure 7:
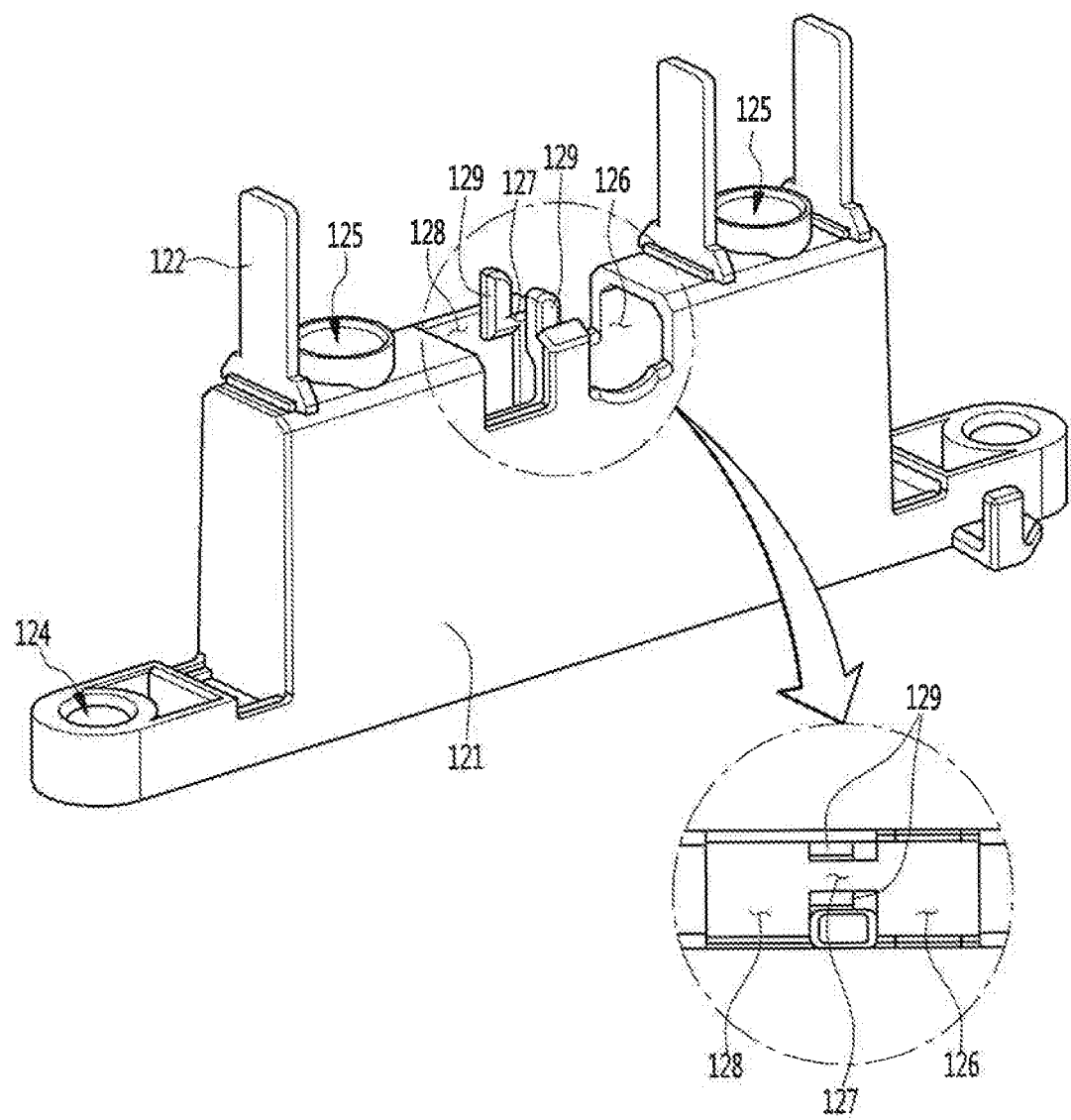
FIG. 7 is a perspective view of a terminal body according to an embodiment.
Figure 8:
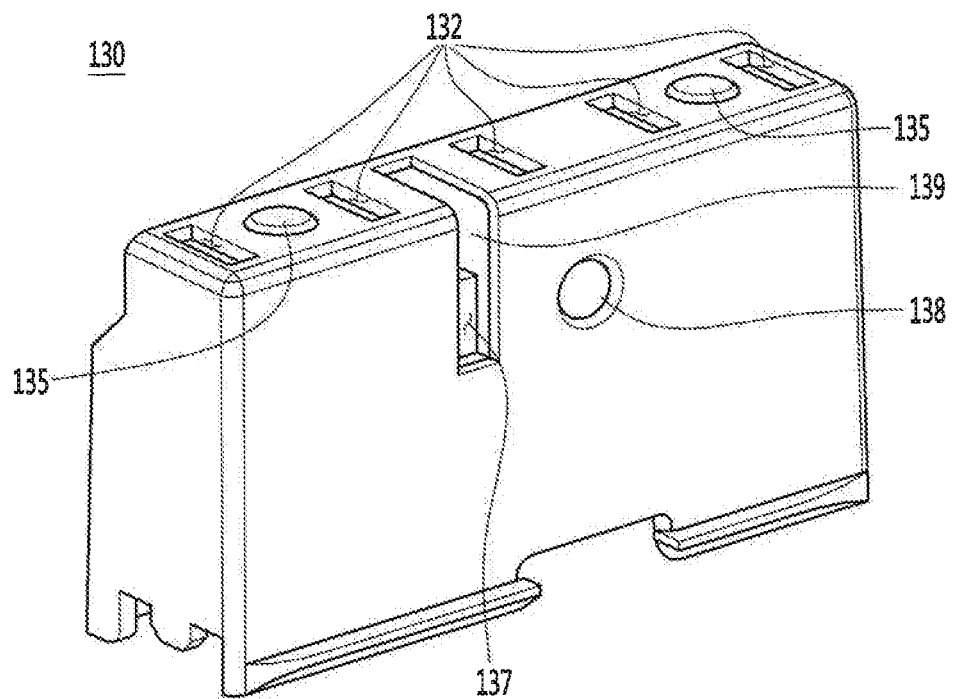
FIG. 8 is a perspective view of a terminal cover according to an embodiment.
Figure 9:
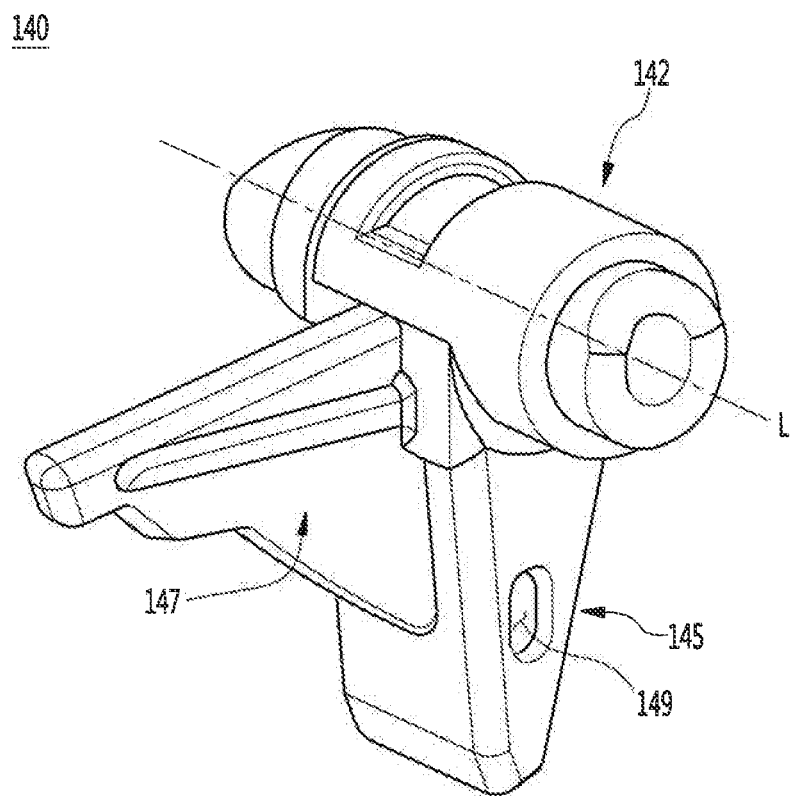
FIG. 9 is a perspective view of a lever according to an embodiment.
Figure 10:
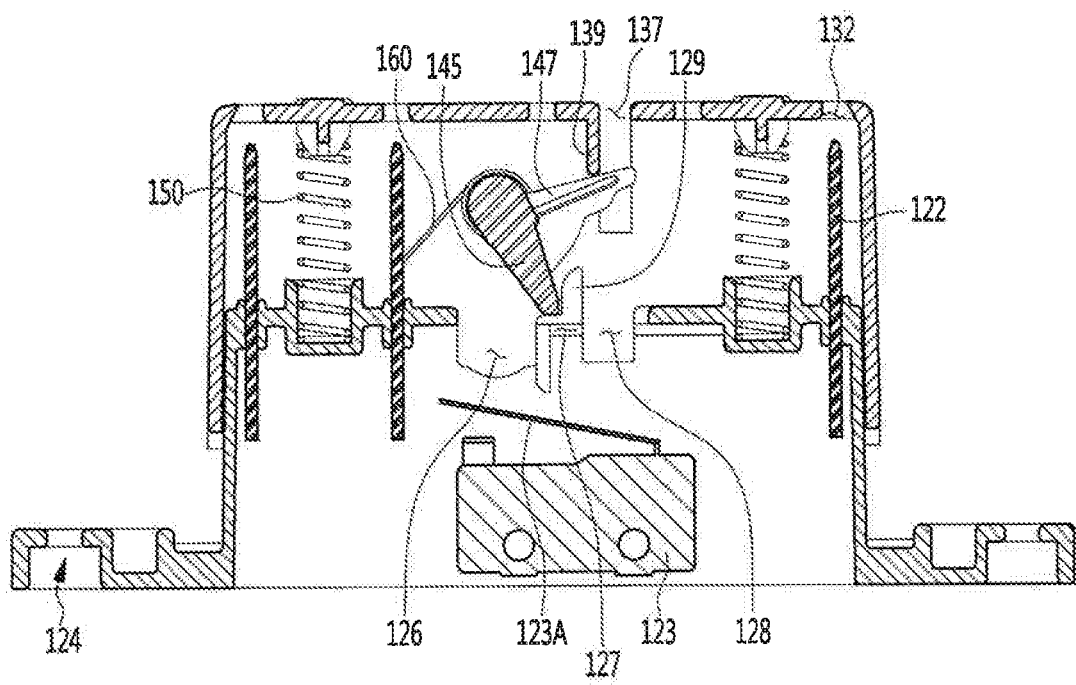
FIG. 10 is a cross-sectional view taken along line A-A of FIG. 5.

FIG. 5 is a perspective view of the output terminal unit according to an embodiment, FIG. 6 is an exploded perspective view of the output terminal unit according to an embodiment, FIG. 7 is a perspective view of a terminal body according to an embodiment, FIG. 8 is a perspective view of a terminal cover according to an embodiment, FIG. 9 is a perspective view of a lever according to an embodiment, and FIG. 10 is a cross-sectional view taken along line A-A of FIG. 5.

Referring to FIGS. 5 to 10, the output terminal unit 110 according to an embodiment may include a terminal body 120 fixed to the holding unit 104, a terminal cover covering at least a portion of the terminal body 120, and a lever 140 disposed between the terminal body 120 and the terminal cover 130.

For example, the terminal body 120 may be fixed to a bottom surface of the holding unit 104, and the terminal cover 130 may cover an upper side of the terminal body 120.

A hole 105 through which the terminal body 120 and the terminal cover 130 pass may be defined on the top surface of the holding unit 104. A portion of each of the terminal body 120 and the terminal cover 130 may be disposed in the holding unit 104, and the other portion may pass through the hole 105 to protrude from the holding unit 104.

Here, before the battery pack 10 is mounted on the charging device 100, the terminal cover 130 may cover the terminal body 120 so that the terminal body 120 is not exposed to the outside.

Also, the output terminal unit 110 may further include an elastic member 150 for elastically supporting the terminal cover 130.

The terminal body 120 includes a plurality of output terminals 122 and a frame 121 supporting the plurality of output terminals 122.

The frame 121 may have a hexahedral shape having an opened bottom surface. Also, the frame 121 may have a rectangular parallelepiped shape of which each of front and rear surfaces has a length greater than that of each of both side surfaces.

Here, the rear surface represents a surface of the frame 121, which faces the charging station body 102, and the front surface represents a surface of the frame 121, which is directed in a direction opposite to the rear surface. (see FIG. 4)

The plurality of output terminals 122 may pass through a top surface of the frame 121 and then be fixed to the frame 121. Thus, a portion of each of the plurality of output terminals 122 may protrude upward from the frame 121, and a remaining portion of each of the plurality of output terminals 122 may be disposed in the frame 121.

The plurality of output terminals 122 disposed in the frame 121 may receive power from the charging station body 102 through the opened bottom surface. Here, a power line (not shown) may be connected to the plurality of output terminals 122.

The plurality of output terminals 122 may be disposed to be spaced a predetermined distance from each other in left and right directions.

The terminal body 120 may further include a micro switch 123 disposed in an inner space of the frame 121 and electrically blocking power flowing to at least one of the plurality of output terminals 122.

When the micro switch 123 is turned off, the electrical connection of at least one of the plurality of output terminals 122 to the power source units disposed in the charging station body 102 may be blocked.

The micro switch 123 may include an actuator 123A disposed to face an upper side, and whether the power is cut off may be determined according to a position of the actuator 123A. For example, when the actuator 123A is pushed, the actuator 123A may be turned on. On the other hand, when the pushing of the actuator 123A is released, the actuator 123A may be turned off.

The terminal body 120 may include a fixing unit 124 extending from one side of the frame 121 to fix the terminal body 120 to the holding unit 104. For example, the fixing unit 124 may be provided in plurality at both lower portions with respect to the frame 121. Here, the fixing unit 124 may be fixed to the bottom surface of the holding unit 104, but the embodiment is not limited thereto. For example, the fixing unit 124 may be disposed on any position of the holding unit 104.

The terminal body 120 may include an elastic member coupling part disposed on the top surface of the frame 121 to support one side of the elastic member 150. The elastic member coupling part 125 may be provided in plurality to correspond to the number of elastic members 150. For example, two elastic member coupling parts 125 may be respectively disposed in left and right directions of the frame 121.

The terminal body 120 may further include insertion parts 126, 127, and 128 into which the lever 140 is inserted. The insertion parts 126, 127, and 128 will be described later.

The terminal cover 130 may have a hexahedral shape having an opened lower surface to cover at least a portion of the terminal body 120. The terminal cover 130 may vertically move in the state in which the terminal cover 130 covers at least a portion of the terminal body 120.

The terminal cover 130 includes a terminal penetration part 132 through which the plurality of output terminals 122 pass and a pressing rib penetration part 137 through which the pressing rib 33 passes.

The terminal penetration part 132 may be disposed on a top surface of the terminal cover 130. When the terminal cover 130 moves downward, the plurality of output terminals 122 may pass through the terminal penetration part 132 to protrude upward from the terminal cover 130 to the outside. On the other hand, when the terminal cover 130 moves upward, the plurality of output terminals 122 are disposed inside the terminal cover 130.

The pressing rib penetration part 137 may be disposed on at least one surface of the terminal cover 130. For example, the pressing rib penetration part 137 may be defined on each of the top and front surfaces of the terminal cover 130. Since the pressing rib penetration part 137 is provided on each of two surfaces, the pressing rib 33 may be easily inserted into the pressing rib penetration part 137.

The terminal cover 130 may include a stopper 139 extending from an edge of the pressing rib penetration part 137 toward the inner space of the terminal cover 130 by a predetermined distance. A second rib 147 of the lever 140, which will be described later, may come into contact with the stopper 139.

The stopper 139 may extend downward from one edge of the pressing rib penetration part 137 so that an interference with the pressing rib 133 does not occur when the pressing rib 133 of the battery pack 10 passes through the pressing rib penetration part 137. That is, the stopper 139 may be disposed to extend in a vertical direction.

The elastic member coupling part 135 may be provided inside the terminal cover 130, and the other side of the elastic member 150 may be fixed to the elastic member coupling part 135.

Since the elastic member 150 has one side coupled to the terminal body 120 and the other side coupled to the terminal cover 130, the terminal cover may move upward or downward according to whether the battery pack 10 is mounted.

The lever 140 may be rotatably coupled to the terminal cover 130.

A lever coupling hole 138 to which the lever 140 is coupled may be defined in the terminal cover 130. The lever coupling hole 138 may be defined on each of two surface facing each other. For example, the lever coupling hole 138 may be defined on each of front and rear surfaces of the terminal cover 130.

Here, a virtual line extending through a center of one lever coupling hole 138 and a center of the other lever coupling hole 138 may be defined as a rotational center line L of the lever 140. In a state in which the lever 140 is coupled to the lever coupling hole 138, the lever 140 may rotate in both directions with respect to the rotational center line L.

The lever 140 may include a rotational shaft 142 inserted into the lever coupling hole 138, a first rib 145 extending from the rotational shaft 142 in a first direction, and a second rib 147 extending from at least one of the rotational shaft 142 and the first rib 145 in a second direction.

The rotational shaft 142 may rotate in both directions with respect to the rotational center line L. The first direction may be a direction that is perpendicular to the rotational center line L of the rotational shaft 142, and the second direction may be a direction perpendicular to the rotational center line L and the first direction.

The first rib 145 in the extension direction of the rotational center line L may have a width greater than that of the second rib 147 in the extension direction of the rotational center line L.

A spring fixing part 149 may be disposed on at least one of the first rib 145 and the second rib 147. A torsion spring 160 may have one end fixed to the spring fixing part 149 and the other end fixed to an inner surface of the terminal cover 130. (see FIG. 10) The torsion spring 160 may allow the lever 140 to rotate in one direction, thereby giving elastic force to the lever 140.

The insertion parts 126, 127, and 128 of the terminal body 120 may include first to third insertion parts 126, 127, and 128.

The first rib 145 may be inserted into the first insertion part 126, and the second rib 147 may be inserted into the second insertion part 127. Also, the pressing rib 33 of the battery pack 10 may be inserted into the third insertion part 128.

A hook part 129 supporting the first rib 145 of the lever 140 may be disposed on an edge of the second insertion part 127.

The hook part 129 may be provided in plurality. For example, the plurality of hook parts 129 may be disposed on both sides of the second insertion part 127, respectively. Alternatively, the hook parts 129 may be disposed on upper ends of the front and rear surfaces of the frame 121, respectively.

Here, an opening of the first insertion part 126 in the extension direction of the rotational center line L may have a width greater than that of an opening of the second insertion part 127 in the extension direction of the rotational center line L.

Thus, the first rib 145 may be hooked with the hook parts 129 disposed on both the sides of the second insertion part 127 or inserted into the first insertion part 126 by the rotation of the lever 140.

The first insertion part 126, the second insertion part 127, or the third insertion part 128 may be defined on at least one of the top, front, and rear surfaces of the frame 121.

For example, the first insertion part 126 may be defined on the top and front surfaces of the frame 121, the second insertion part 127 may be defined on the top surface of the frame 121, and the third insertion part 128 may be defined on the top and front surfaces of the frame 121.

In this embodiment, although each of the first to third insertion parts 126, 127, and 128 is defined in the frame 121, the embodiment is not limited thereto. For example, one opening passing through the frame 121 may be divided into three parts according to a position of the opening or an insertion configuration.

Referring to FIG. 10, in a state in which the battery pack 10 is not mounted on the charging device 100, the terminal cover 130 covers the output terminal 122 so that the output terminal 122 is not exposed to the outside. That is, the elastic force of the elastic member 150 may be applied to the terminal cover 130 to locate the terminal cover 130 at a position (a first position) to which the terminal cover 130 moves upward.

When the terminal cover 130 moves to the first position, the terminal penetration part 132 defined on the top surface of the terminal cover 130 may be disposed above the output terminal 122.

Also, the lever 140 receives the elastic force, which rotates in one direction (in a counterclockwise direction in FIG. 10), from the torsion spring to maintain the state in which the first rib 145 of the lever 140 is hooked with the hook part 129. Also, the second rib 147 may be maintained in the state in which the second rib 147 comes into contact with the stopper 139.

In the state as illustrated in FIG. 10, since the output terminal 122 does not protrude outward from the terminal cover 130, the user may be prevented from coming into contact with the output terminal 122.

Also, in the state as illustrated in FIG. 10, since external force applied to the actuator 123A does not exist, the micro switch 123 may be maintained in OFF state. Thus, at least one of the plurality of output terminals 122 may be prevented from being connected to the power source unit.

That is, according to an embodiment, a risk of electric shock due to the user's contact with the output terminal 122 may be prevented from occurring through a double insulating structure of a first insulating structure for preventing the output terminal 122 from being exposed and a second insulating structure for maintaining the OFF state of the micro switch 123.

In the state as illustrated in FIG. 10, when the external force is applied from an upper side of the terminal cover 130, the hooked state of the first rib 145 with respect to the hook part 129 may be maintained to prevent the terminal cover 130 from moving downward. Also, the first rib 145 passes through the first insertion part 126 to prevent the actuator 123A from being operated.

Figure 11:
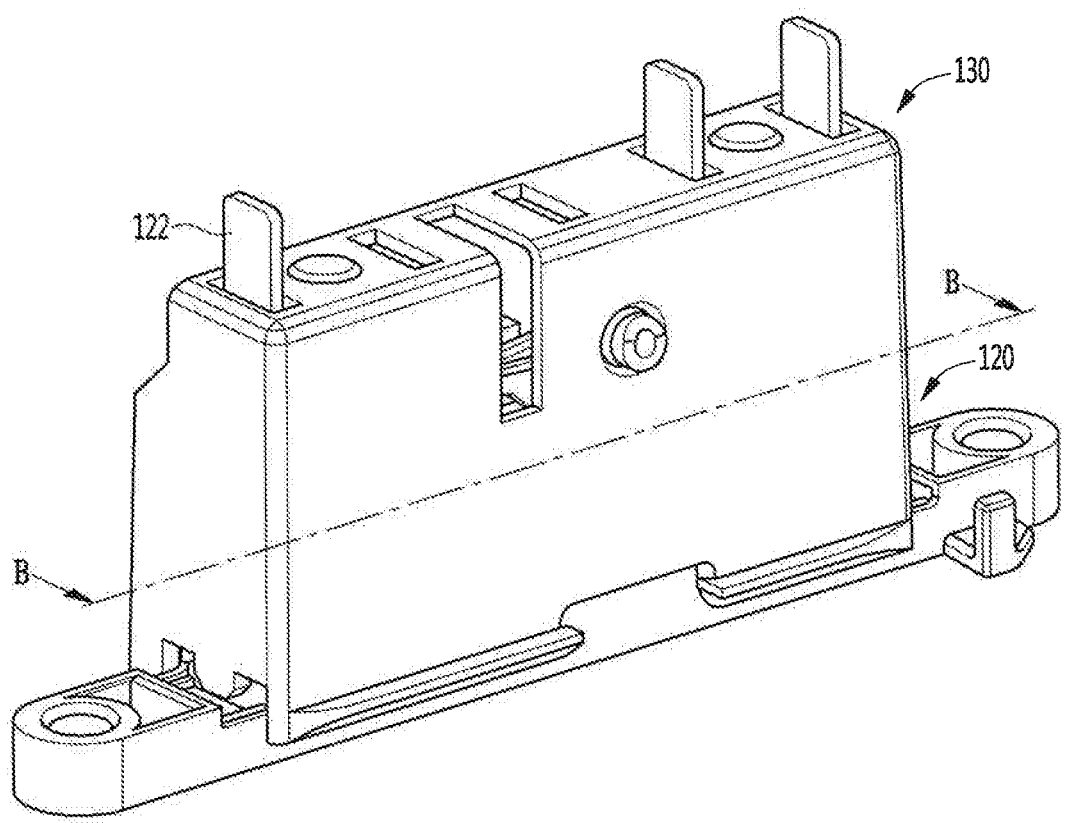
FIG. 11 is a perspective view of the output terminal unit from which an output terminal is led out according to an embodiment.
Figure 12:
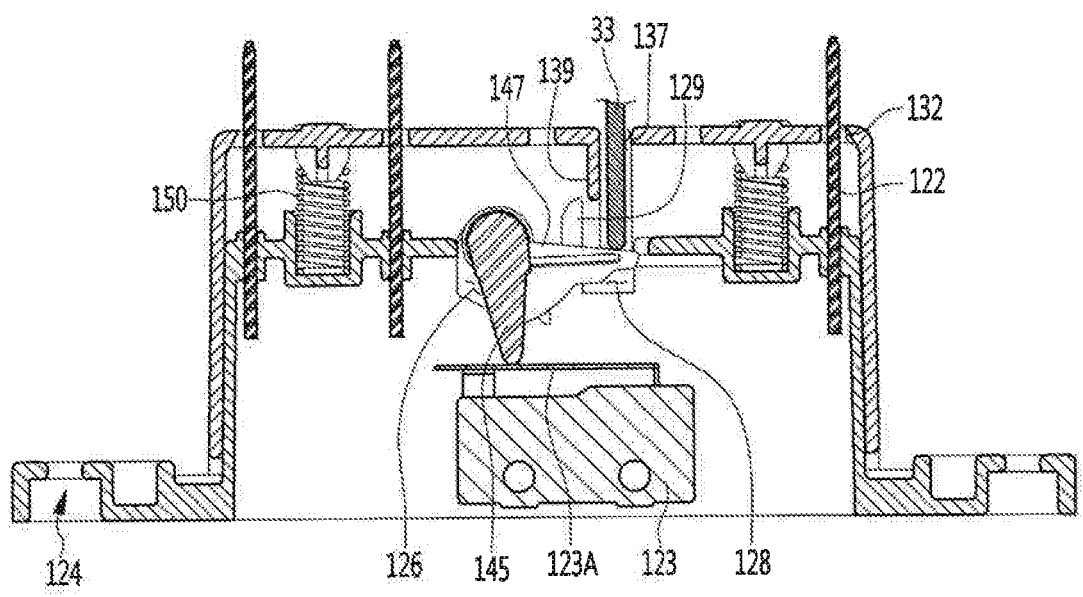
FIG. 12 is a cross-sectional view taken along line B-B of FIG. 11.

FIG. 11 is a perspective view of the output terminal unit from which the output terminal is led out according to an embodiment, and FIG. 12 is a cross-sectional view taken along line B-B of FIG. 11.

Referring to FIGS. 11 and 12, as the battery pack 10 is mounted on the holding unit 104, the pressing rib 33 is inserted into the pressing rib penetration part 137.

Here, the first recessed surface 31 may come into contact with the front surface of the terminal cover 130, and the second recessed surface 32 may come into contact with the top surface of the terminal cover 130.

The pressing rib 33 presses the second rib 147 supported by the stopper 139. Thus, the second rib 147 rotates in the other direction (in a clockwise direction in FIG. 12). As the second rib 147 rotates, the lever 140 rotates in the other direction, and the first rib 145 is separated from the hook part 129. Thus, while the lever 140 rotates, the hooked state between the lever 140 and the terminal body 120 may be released.

The top surface of the terminal cover 130 comes into contact with the first recessed surface 31, and the terminal cover 130 is pressed by the first recessed surface 31.

Here, since the first rib 145 is separated from the hook part 129 and thus the hooking of the first rib 145 is released, the first rib 145 is in a state in which the first rib 145 is insertable into the first insertion part 126. Thus, while the battery pack 10 is mounted, the terminal cover 130 may move downward. Also, when the elastic member 150 is compressed while the battery pack 10 is mounted, a distance between the terminal penetration part 132 of the terminal cover 130 and the output terminal 122 is reduced.

While the terminal cover 130 moves downward, the output terminal 122 disposed above the frame 121 passes through the terminal penetration part 132 to protrude upward from the terminal cover 130.

Here, the second recessed surface 32 of the battery unit 20 is seated on the top surface of the terminal cover 130, and the output terminal 122 protruding to the outside of the terminal cover 130 is inserted into the input terminal 36.

Also, as the terminal cover 130 moves downward, the lever 140 may also move downward together with the terminal cover 130, and the lever 140 may be inserted into the insertion parts 126, 127, and 128. That is, the first rib 145 is inserted into the first insertion part 126, and the second rib 146 is inserted into the second insertion part 127.

The first rib 145 presses the actuator 123A of the micro switch 123 to turn on the micro switch 123. Thus, while the lever 140 moves downward, the lever 140 turns on the micro switch 123.

Here, the pressing rib 33 passing through the pressing rib penetration part 137 may be inserted into the third insertion part 128.

In this embodiment, although the two processes of the rotation of the lever 140 and the vertical movement of the lever 140 are described for convenience, it is understood as a process that occurs at the same time. That is, rotation and translation of the lever 140 may occur at the same time.

According to this embodiment, since the first rib 145 presses the actuator 123A, power may be applied to the output terminal 122. Also, since the output terminal 122 protrudes upward from the terminal cover 130, the output terminal 122 may be electrically connected to the battery pack 10. Since the above-described two processes occur at the same time by one manipulation, user convenience may be improved.

Thus, when a peak voltage of the battery pack 10 is above about 42.4 V, the charging may be enabled in the charging device.

Hereinafter, a charging device according to another embodiment will be described.

Figure 13:
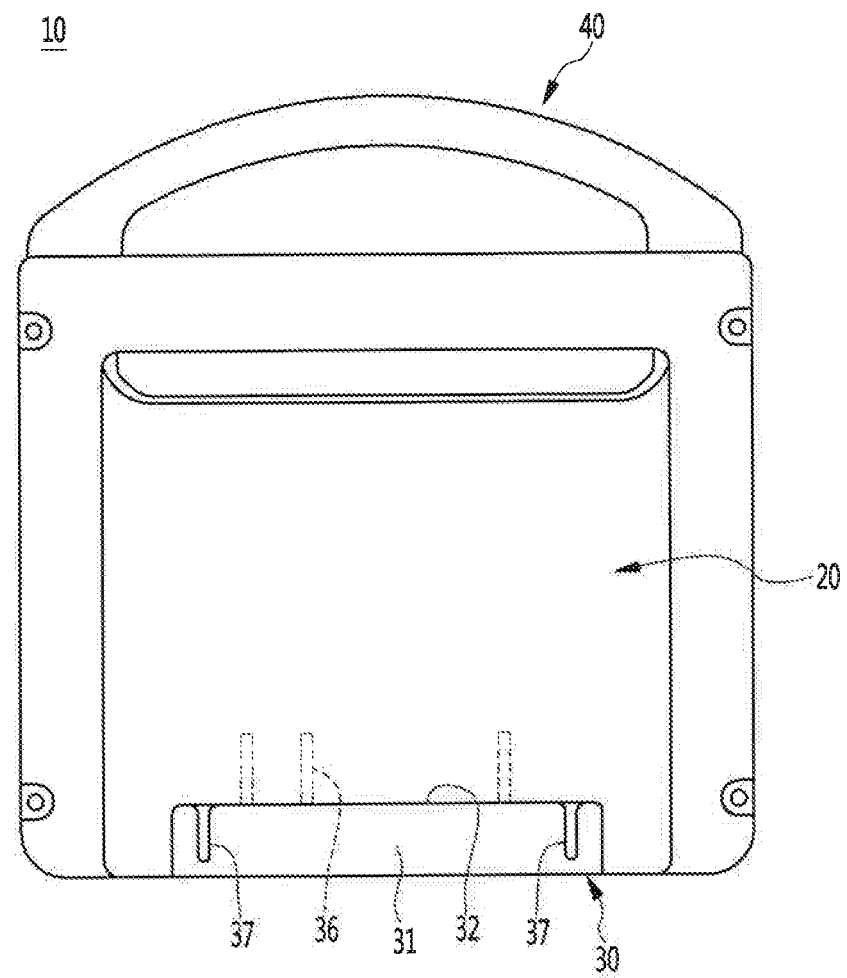
FIGS. 13 and 14 are views of a battery pack according to another embodiment.
Figure 14:
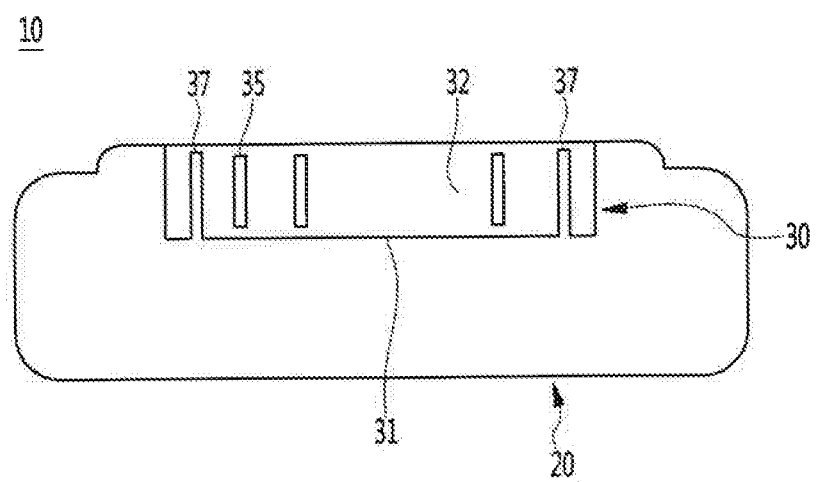
Figure 15:
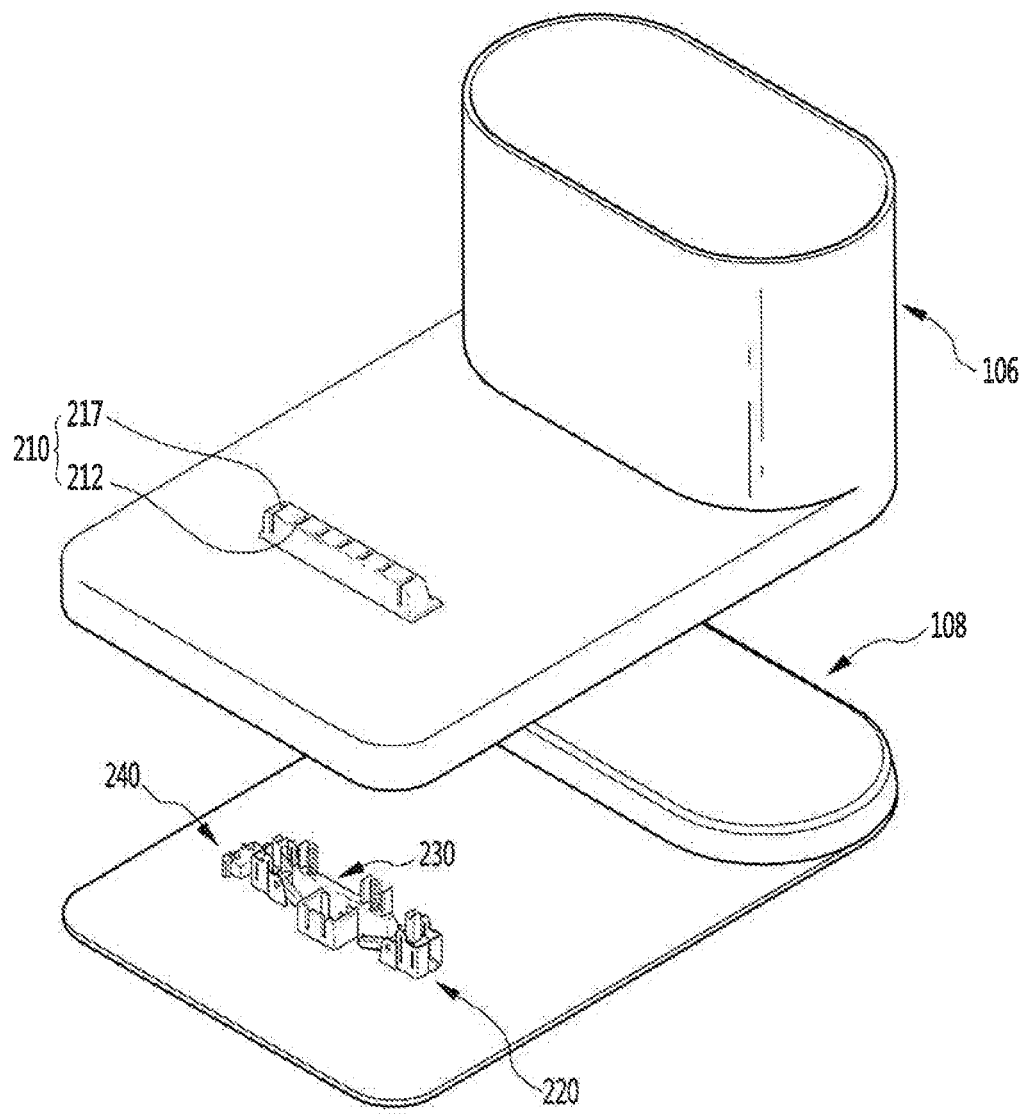
FIG. 15 is a perspective view of a charging station according to another embodiment.

FIGS. 13 and 14 are views of a battery pack according to another embodiment, and FIG. 15 is a perspective view of a charging station according to another embodiment.

Referring to FIGS. 13 to 15, a battery pack 10 according to another embodiment includes a battery unit 20 in which a battery is accommodated and an input terminal unit 30 connecting the battery unit 20 to the charging device 100 to supply power to the battery unit 20.

The input terminal unit 30 may be disposed on one side of the battery pack 10. For example, the input terminal unit 30 may be disposed on a lower portion of the battery pack 10.

The input terminal unit 30 may have a recessed space that is recessed inward from at least one surface of the battery unit 20 by a predetermined depth. For example, the recessed space may be defined by a first recessed surface 31 that is recessed from one surface of the battery unit 20 by a predetermined depth and a second recessed surface 32 that is recessed from a bottom surface of the battery unit 20 by a predetermined depth.

The input terminal unit 30 may further include a second pressing rib 37 extending from the first recessed surface 31. Here, the second pressing rib 37 may have one edge extending to come into contact with the second recessed surface 32.

In other aspect, the second pressing rib 37 may extend downward from the second recessed surface 32. The pressing rib 37 may have one edge coming into contact with the first recessed surface 31.

The input terminal unit 30 may further include a plurality of input terminals 36 connected to the battery unit 20. The plurality of input terminals 36 may be disposed in the battery unit 20. The charging device 100 may have a plurality of terminal insertion holes 35 on the second recessed surface 32 so that output terminals 232 that will be described later are inserted.

The second pressing rib 37 may be provided in plurality, and the plurality of second pressing ribs 37 may be respectively disposed on both sides of the input terminal unit 30. That is, the plurality of terminal insertion holes 35 may be defined in a space between the plurality of second pressing ribs 37. Also, the terminal insertion holes 35 may be horizontally spaced apart from each other in the space between the second pressing ribs 37.

The battery pack 10 may further include a handle 40 disposed on one side of the battery unit 20. For example, the handle 40 may be disposed above the battery unit 20. Thus, the battery pack 10 may be mounted on the charging device 100 so that a user grasps the handle 40 disposed on an upper portion of the battery pack 10, and the input terminal unit 30 disposed on a lower portion of the battery pack 10 is connected to a terminal body 230 that will be described later.

The charging device 100 includes an upper case 106 defining an upper appearance and a lower case 108 disposed below the upper case 106 to define a lower appearance.

A plurality of power source units may be provided in an inner space between the upper case 106 and the lower case 108. For example, each of the plurality of power source units may include at least one of transformer, a rectifier, and a power circuit breaker.

The battery pack 10 may be seated on one side of the upper case 106. For example, a bottom surface of the battery pack 10 may be seated on a top surface of the upper case 106.

The upper case 106 may include a terminal cover 210 through which an output terminal 232 that will be described later is led in and out and which covers a terminal body 230 that will be described later.

The terminal cover 210 may protrude upward from a top surface of the upper case 106 by a predetermined distance. Also, the terminal cover 210 may protrude in a size corresponding to that of the input terminal unit 30.

For example, the terminal cover may have a front surface coming into contact with the first recessed surface 31 and a top surface coming into contact with the second recessed surface 32. Here, the front surface of the terminal cover 210 represents a direction that is directed from the terminal cover 210 toward the battery pack 10.

The terminal cover 210 includes a terminal penetration part 212 through which the output terminal 232 passes and a pressing rib penetration part 217 through which the second pressing rib 37 passes.

The terminal penetration part 212 may be disposed on the top surface of the terminal cover 210. The terminal penetration part 212 may be provided in plurality, and the plurality of terminal penetration parts 212 may be horizontally spaced apart from each other.

Also, the pressing rib penetration part 217 may be defined on each of the top and front surfaces of the terminal cover 210. Thus, a coupling direction when being coupled to the battery pack 10 is not limited to a vertical direction. The pressing rib penetration part 217 may be defined to correspond to the second pressing rib 37.

In this embodiment, although the terminal cover 210 protrudes from the top surface of the upper case 106, the embodiment is not limited thereto. For example, the terminal cover 210 may have various shapes as long as the terminal cover 210 has a shape corresponding to that of the input terminal unit 30.

Also, although the terminal cover 210 is included in the upper case 106, the terminal cover 210 may be provided as a separate part with respect to the upper case 106 and then coupled to the upper case 106.

The charging device 100 may further include the terminal body 230 and a moving mechanism 240 for moving the terminal body 230.

Figure 16:
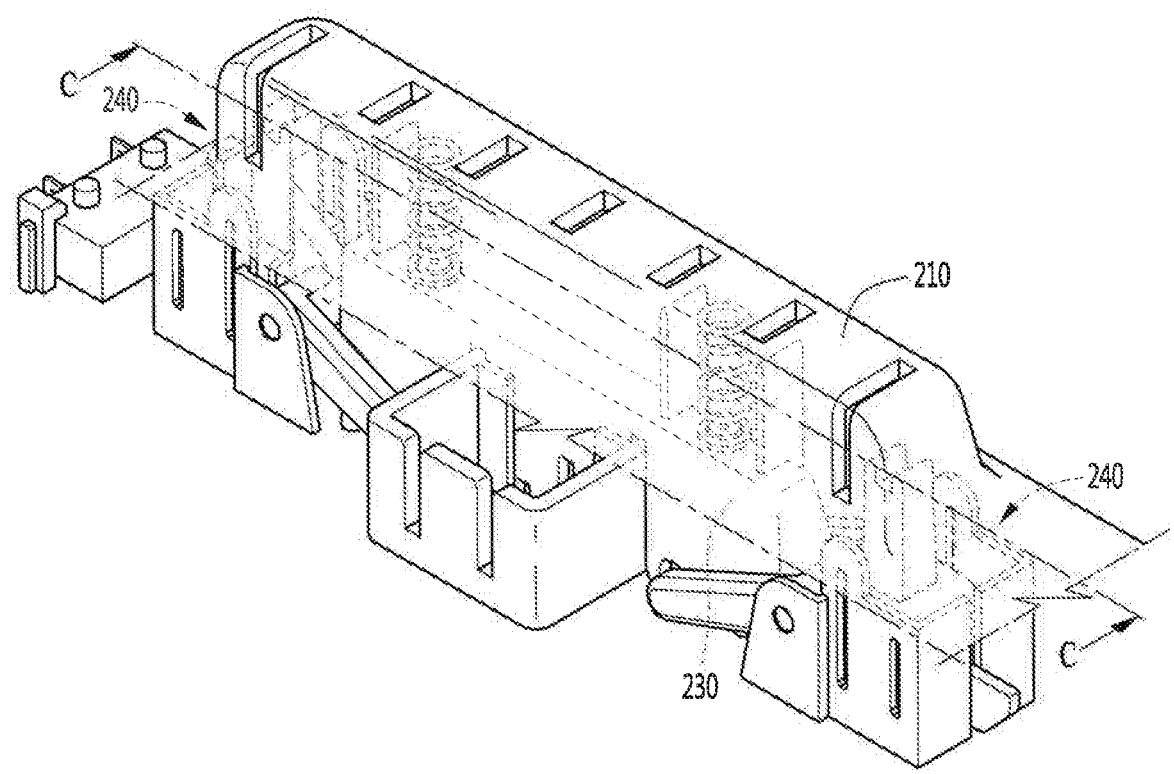
FIG. 16 is a perspective view of a terminal body, a moving mechanism, and a fixing unit according to another embodiment.
Figure 17:
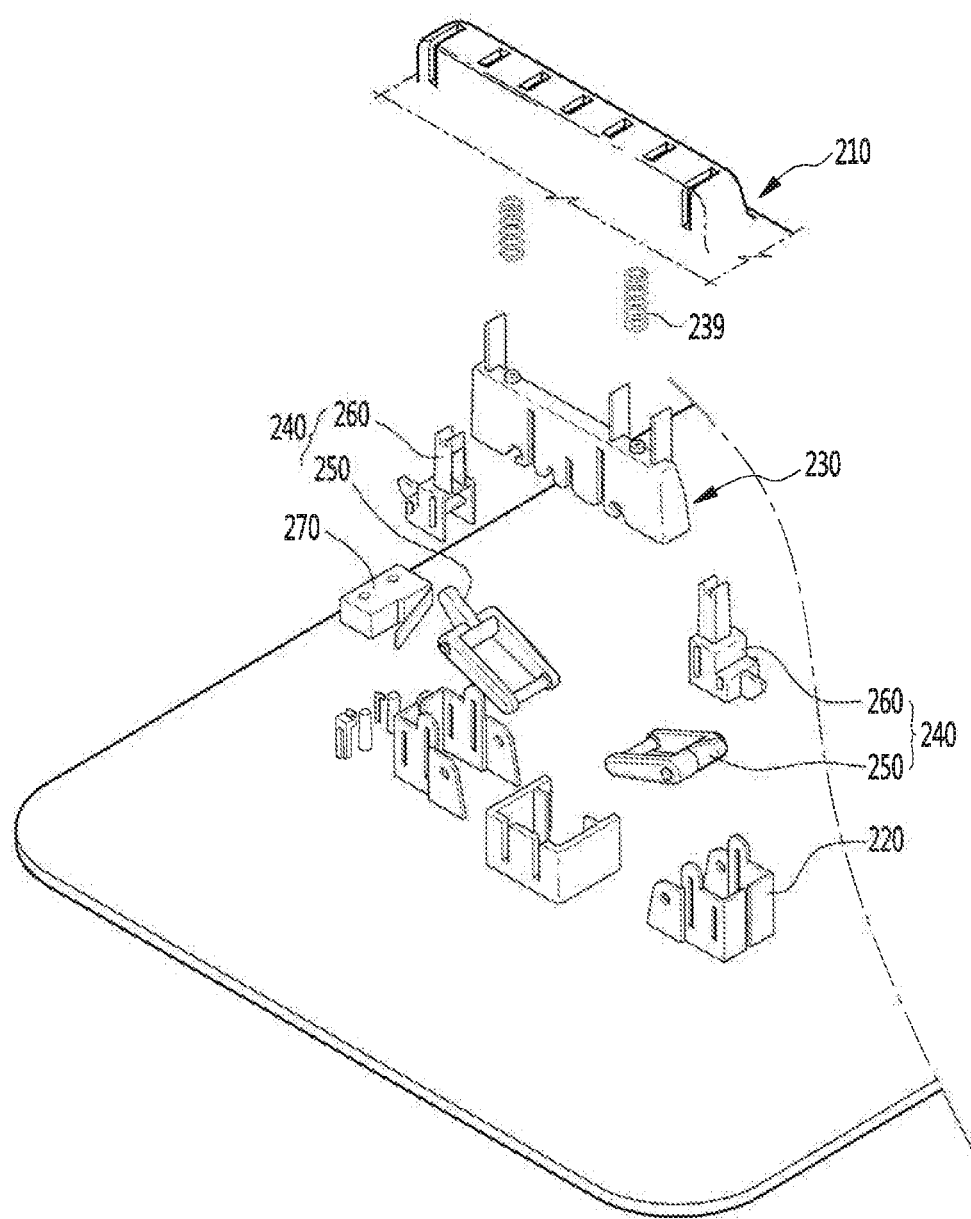
FIG. 17 is an exploded perspective view of the terminal body, the moving mechanism, and the fixing unit according to another embodiment.
Figure 18:
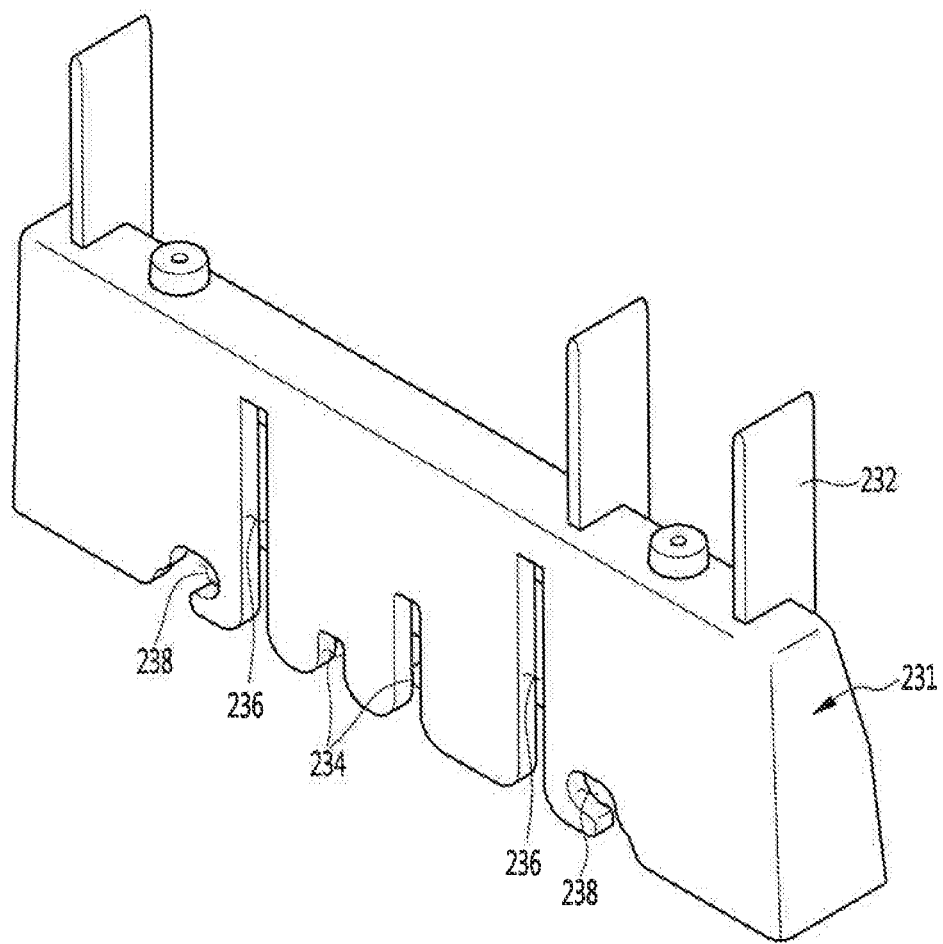
FIG. 18 is a perspective view of the terminal body according to another embodiment.

FIG. 16 is a perspective view of the terminal body, the moving mechanism, and a fixing unit according to another embodiment, FIG. 17 is an exploded perspective view of the terminal body, the moving mechanism, and the fixing unit according to another embodiment, and FIG. 18 is a perspective view of the terminal body according to another embodiment.

Referring to FIGS. 16 to 18, the terminal body 230 includes an output terminal 232 inserted into the input terminal 35 and a frame 231 fixing the output terminal 232.

The frame 231 may have a bottom surface with a hexahedral shape. That is, the frame 231 has a hexahedral shape of which each of front and rear surfaces has a length greater than that of each of both left and right surfaces.

The output terminal 232 may pass through a top surface of the frame 231 and then be fixed to the frame 231. Here, the output terminal 232 may be disposed so that a portion of the output terminal 232 protrudes upward from the frame 231. The remaining portion of the output terminal 232 may be disposed in an inner space of the frame 231. The output terminal 232 disposed in the inner space of the frame 231 may be electrically connected to a power line (not shown) to which power is applied from a power source unit. Here, the power line may be disposed on one side of the frame 231 to pass through a wiring part 234 through which the power line passes.

The output terminal 232 may be provided in plurality, and the plurality of output terminals 232 may be horizontally spaced apart from each other on the top surface of the frame 231.

The frame 231 may vertically move by the moving mechanism 240. In a state in which the frame 231 moves upward, the frame 231 may be inserted into the inner space of the terminal cover 210, and the output terminal 232 protruding upward from the frame 231 may pass through the terminal penetration part 212 to protrude upward from the terminal cover 210.

A guide part 236 for guiding the vertical movement of the frame 231 may be disposed on the frame 231. For example, the guide part 236 may be disposed on the front surface of the frame 231. Also, the guide part 236 may have a hole that extends in a vertical direction. Also, the guide part 236 may be provided in plurality, and the plurality of guide parts 236 may be disposed to be horizontally spaced apart from each other.

The moving mechanism 240 may include a lever connected to the frame 231 and a link connected to the lever and moving by the second pressing rib 37 extending from the battery pack 10.

The terminal body may move in the vertical direction. Also, a plurality of moving mechanisms 240 may be connected to the terminal body so that the terminal body stably moves in the vertical direction.

The frame may further include a lever coupling part 238 for coupling the lever. The lever coupling part 238 may be provided in plurality, and the plurality of lever coupling parts 238 may be disposed to be horizontally spaced apart from each other.

For example, the lever coupling part 238 may be disposed on each of the front and rear surfaces of the frame 231. Also, the lever coupling part 238 disposed on the front surface and the lever coupling part 238 disposed on the rear surface may be disposed in a pair.

The lever coupling part 238 may have a curved surface with a predetermined curvature so that an elevation part 257 of the lever, which will be described later, is rotatably coupled. Also, the lever coupling part 238 may be longitudinally disposed in the horizontal direction so that the elevation part 257 horizontally moves in a state where the elevation part 257 is coupled to the lever coupling part 238.

The charging device 100 may further include a fixing unit to which the terminal body 230 and the moving mechanism 240 are fixed.

Also, the charging device 100 may further include a micro switch that is turned on or off by the link.

Figure 19:
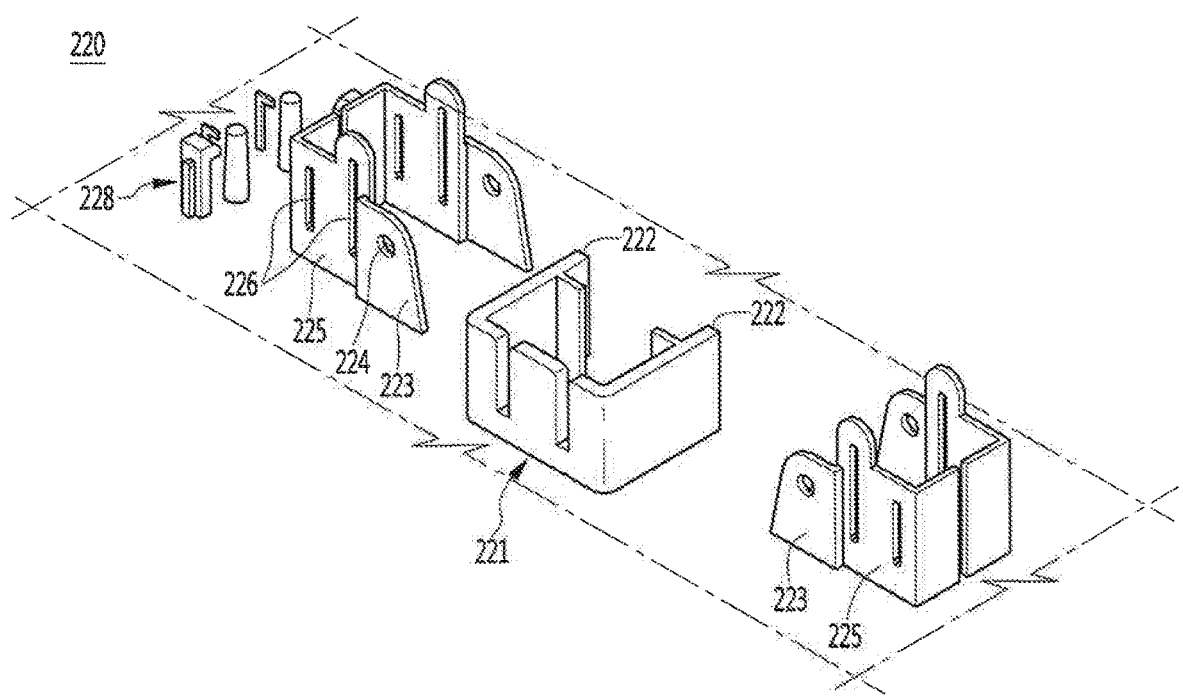
FIG. 19 is a perspective view of the fixing unit according to another embodiment.
Figure 20:
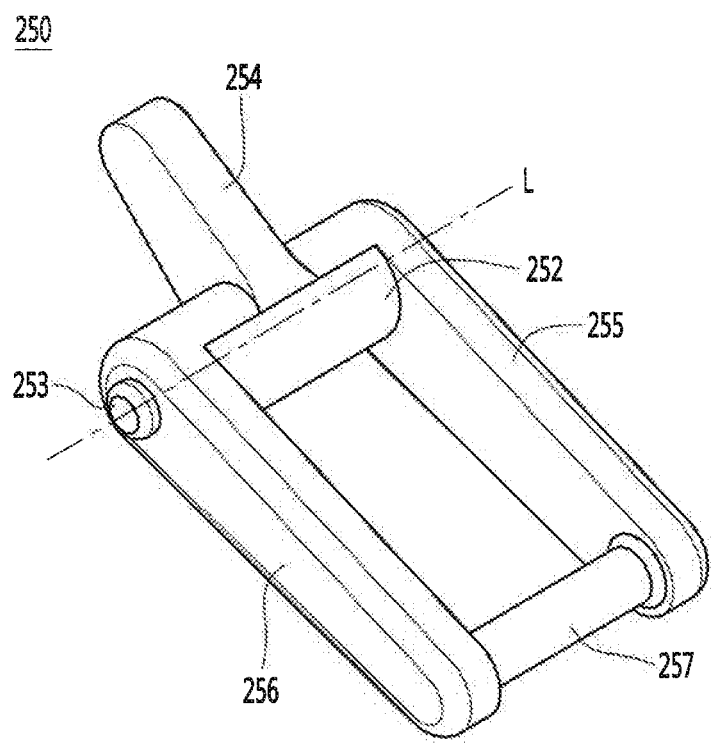
FIG. 20 is a perspective view of a lever according to another embodiment.
Figure 21:
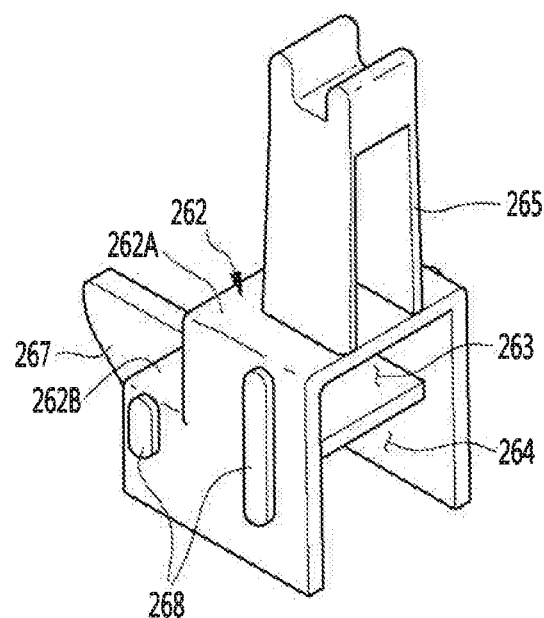
FIG. 21 is a perspective view of a link according to another embodiment.

FIG. 19 is a perspective view of the fixing unit according to another embodiment, FIG. 20 is a perspective view of the lever according to another embodiment, and FIG. 21 is a perspective view of the link according to another embodiment.

Referring to FIGS. 19 to 21, the fixing unit 220 may include a terminal body support part 221 guiding the vertical movement of the terminal body 230. Also, the fixing unit 220 may further include a lever fixing part 223 to which the lever 250 is rotatably coupled. Also, the fixing unit 220 may further include a link support part 225 guiding the vertical movement of the link 260 that will be described later. Also, the fixing unit 220 may further include a switch fixing part 228 fixing the micro switch 270 to the lower case 108.

The lever 250 may include a lever body 252 and a protrusion 253 disposed on one side of the lever body 252 to fix the lever body 252 to the fixing unit 220.

The lever body 252 may have a cylindrical shape of which each of front and rear surfaces has a circular shape. The lever body 252 may rotate in both directions with respect to a rotational axis L passing through centers of the front and rear surfaces.

The protrusion 253 may be provided in plurality, and the plurality of protrusions 253 may protrude from both sides of the lever body 252. That is, the protrusions 253 may be defined on the same line to serve as a rotational axis.

The protrusion 253 may have a curved surface with a predetermined curvature so that the protrusion 253 is rotatably coupled to the lever fixing part 223.

The lever fixing part 223 may be disposed at each of front and rear sides of the lever 245. The lever fixing part 223 disposed at the front side of the lever 250 and the lever fixing part 223 disposed at the rear side of the lever 250 may be disposed in a pair.

The lever fixing part 223 may include a coupling hole 224 to which the protrusion 253 is coupled. In a state in which the protrusion 253 is inserted into the coupling hole 224, the lever 250 may rotate in both directions.

The lever 250 may further include a pressing part 254 extending from the lever body 252 in a first direction. The pressing part 254 may extend from the lever body 252 in the first direction that is perpendicular to a rotational center line L of the lever body 252.

The pressing part 254 may extend from a central portion of the lever body 252. The pressing part 254 may be pressed by the link 260. When the pressing part 254 is pressed, the lever body 252 may rotate in one direction.

The lever 250 may further include ribs 255 and 256 extending from the lever body 252 in a second direction. The ribs 255 and 256 may extend from the lever body 252 in the second direction that is perpendicular to the rotational center line L of the lever body 252. Here, the first direction in which the pressing part 254 extends and the second direction in which the ribs 255 and 256 extend may cross each other. Here, the crossing angle may be, for example, an obtuse angle.

The ribs 255 and 256 include a first rib 255 extending from the front surface of the lever body 252 and a second rib 256 extending from the rear surface of the lever body 252.

The first ribs 255 and the second rib 256 may extend in the same direction and be disposed to be spaced apart from each other in a direction parallel to the rotational center line L.

The lever 250 may further include the elevation part 257 fixing the ribs 255 and 256 to the lever coupling part 238. The elevation part 257 may connect the first rib 255 and the second rib 256 to each other.

For example, the elevation part 257 may extend from a rear surface of the first rib 255 to a front surface of the second rib 256. Alternatively, the plurality of elevation parts may respectively extend from the ribs 255 and 256 in a direction approaching each other and also be spaced apart from each other.

The elevation part 257 may be coupled to the lever coupling part 238.

The elevation part 257 may have a cylindrical shape so that the elevation part 257 is rotatably coupled to the lever coupling part 238. However, the cylindrical shape may have a cross-sectional area less than an area of the lever coupling part 238.

The lever coupling part 238 may be longitudinally disposed in the horizontal direction so that the frame 231 ascends without an interference between the elevation part 257 and the frame 231 while the lever 250 rotates. That is, the lever coupling part 238 may have a curved portion having the same shape as a moving trajectory of the elevation part 257 while the lever 250 rotates.

When the pressing part 254 is pressed to move downward, the lever body 252 may rotate. Thus, since the first to second ribs 255 and 256 move upward, the elevation part 257 may move the frame 231 upward.

The link 260 may include a link body 262 that is movable in the vertical direction. The link body 262 may have an substantially hexahedron shape of which a bottom surface and one side are opened.

Also, the link body 262 may have a first surface 262A and a second surface 262B disposed below the first surface, which are disposed to be vertically spaced apart from each other. A lever accommodation part 263 in which a portion of the lever 250 is accommodated may be defined between the first surface 262A and the second surface 262B.

The pressing part 254 of the lever 250 may be inserted into the lever accommodation part 263. For example, the pressing part 254 may be inserted into the lever accommodation part 263 through the opened one surface. As the link body 262 moves in the vertical direction, the first surface 262A and the second surface 262B may press the pressing part 254 to rotate the lever 250.

For example, when the link body 262 moves downward, the first surface 262A may press an upper portion of the pressing part 254 downward to rotate the lever 250 in one direction. On the other hand, when the link body 262 moves upward, the second surface 262B may press a lower portion of the pressing part 254 upward to rotate the lever 250 in the other direction.

The link 260 may further include an elastic member accommodation part 264.

The elastic member accommodation part 264 may be defined as a space between the second surface 262B and the opened bottom surface. An elastic member 280 may be disposed in the elastic member accommodation part 264.

Also, an elastic member 239 may also be disposed between the terminal cover 210 and the terminal body 230.

The elastic member 280 may have one side coupled to the second surface 262B and the other side coupled to the lower case 108 to provide elastic force to the link 260 so that the link 260 moves upward.

The link 260 may further include a pressing rib support part 265 disposed on the first surface 262A. The pressing rib support part 265 may protrude upward from the first surface 262A.

The pressing rib support part 265 supports the second pressing rib 37 passing through the pressing rib penetration part 217. When the second pressing rib 37 is supported by the pressing rib support part 265, the link 260 may move downward together with the second pressing rib 37 by pressing force applied from the second pressing rib 37.

The link 260 may further include an operation rib 267 protruding from the link body 262. Here, the micro switch 270 may be disposed on one side of the link 260, and the operation rib 267 may protrude from the link body 262 toward the micro switch 270.

The operation rib 267 may selectively press the micro switch 270. Also, the operation rib 267 may have an upper portion larger than a lower portion thereof. For example, the operation rib 267 may have an extension length that gradually decreases from the upper portion to the lower portion. For another example, the operation rib 267 may have an inverted triangular shape having an area that gradually decreases from the upper portion to the lower portion.

When the pressing force is not applied to the link 260 from the second pressing rib 37 of the battery pack 10, the operation rib 267 is spaced apart from the micro switch 270.

When the pressing force is applied to the link 260 from the second pressing rib 37 of the battery pack 10, the operation rib 267 may press the micro switch 270.

The link 260 may include a guide part disposed on one surface of the link body 262. For example, the guide part 268 may be disposed on each of front and rear surfaces of the link body 262, and the guide part 268 may protrude from each of the front and rear surface of the link body 262 by a predetermined distance. Also, the guide part 268 may extend in the vertical direction. The guide part 268 may guide the vertical movement of the link 260.

The link 260 may be fixed to the lower case 108 by the link support part 225. The link support part 225 may include a sliding hole 226. Thus, the guide part 268 may be inserted into the sliding hole 226.

The micro switch 270 may selectively block power flowing to the output terminal 232. The micro switch 270 may include an actuator 270A disposed on one side thereof, and the actuator 270A may be disposed toward the one side to face the link 260.

Whether power is applied to the actuator 270A may be determined according to a position thereof. For example, when the actuator 270A is pushed by the operation rib 267, the actuator 270A may be turned on. On the other hand, when the pushing of the actuator 270A is released, the actuator 270A may be turned off.

The micro switch 270 may be fixed to the lower case 108 by the switch fixing part 228. The switch fixing part 228 may be disposed on one side of the link support part 225.

The micro switch 270 and the switch fixing part 228 may be disposed on one side of the link 260. However, the embodiment is not limited thereto. For example, the micro switch 270 and the switch fixing part 228 may be disposed on both sides of the link 260, respectively.

In this embodiment, although the charging device 100 includes the upper case 106 and the lower case 108, and the terminal body 230 moves upward, the embodiment is not limited thereto. For example, the charging device 100 may be provided as one case, and the terminal body 230 may move outward. Also, the charging device 100 may be constituted by a left case and a right case, and the terminal body 230 may move in left and right directions.

The terminal body support part 221 may be disposed to correspond to the guide part 236 of the frame 231. For example, the terminal body support part 221 may include a rib 222 inserted into the guide part 236. Since the guide part 236 is coupled to the terminal body support part 221 to move in the vertical direction, the terminal body 230 may be prevented from moving in a state in which the terminal body 230 is tilted in one direction, and the plurality of output terminals 232 may be led out at the same time.

Figure 22:
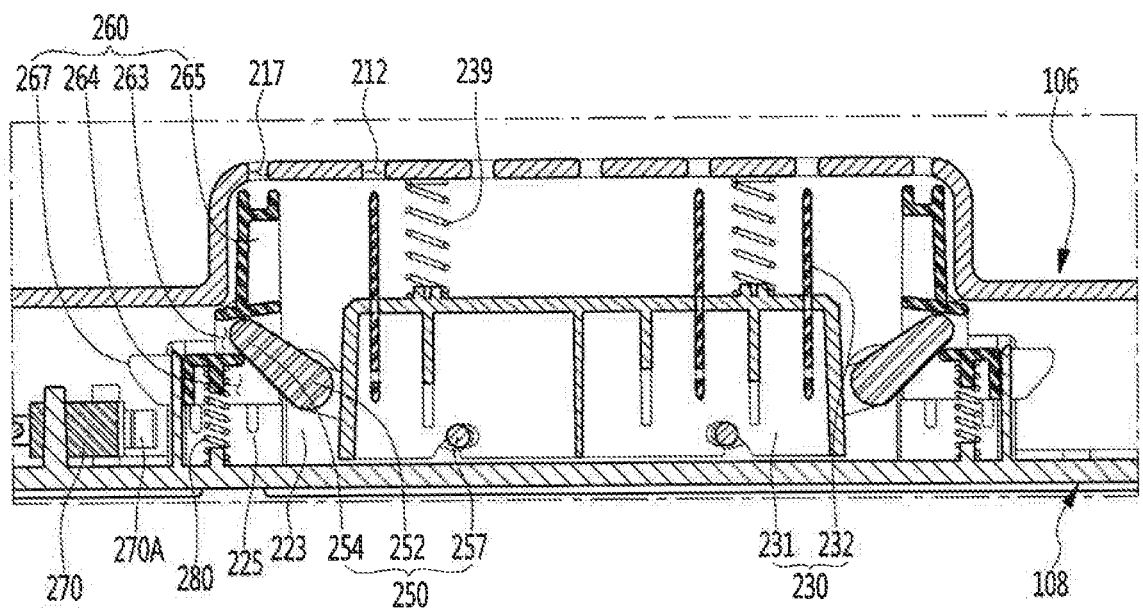
FIG. 22 is a cross-sectional view taken along line C-C of FIG. 16.
Figure 23:
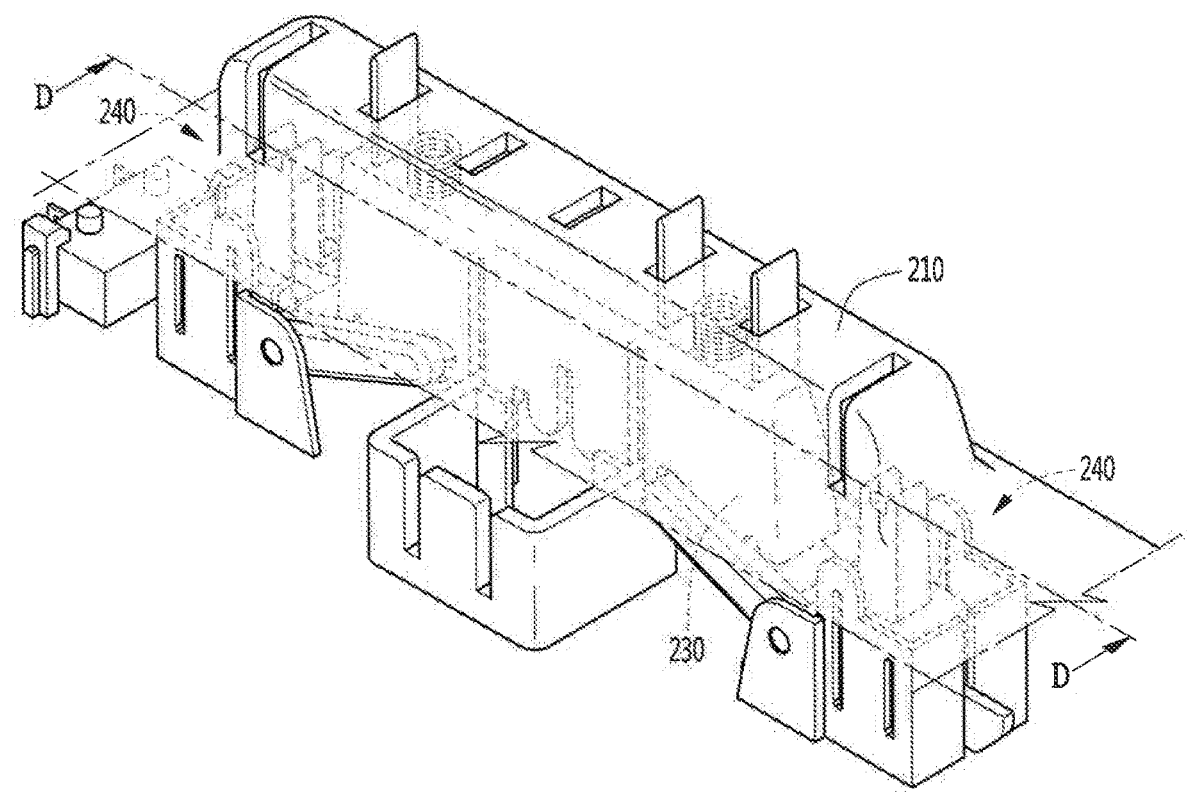
FIG. 23 is a perspective view of the terminal body from which an output terminal is led out according to another embodiment.
Figure 24:
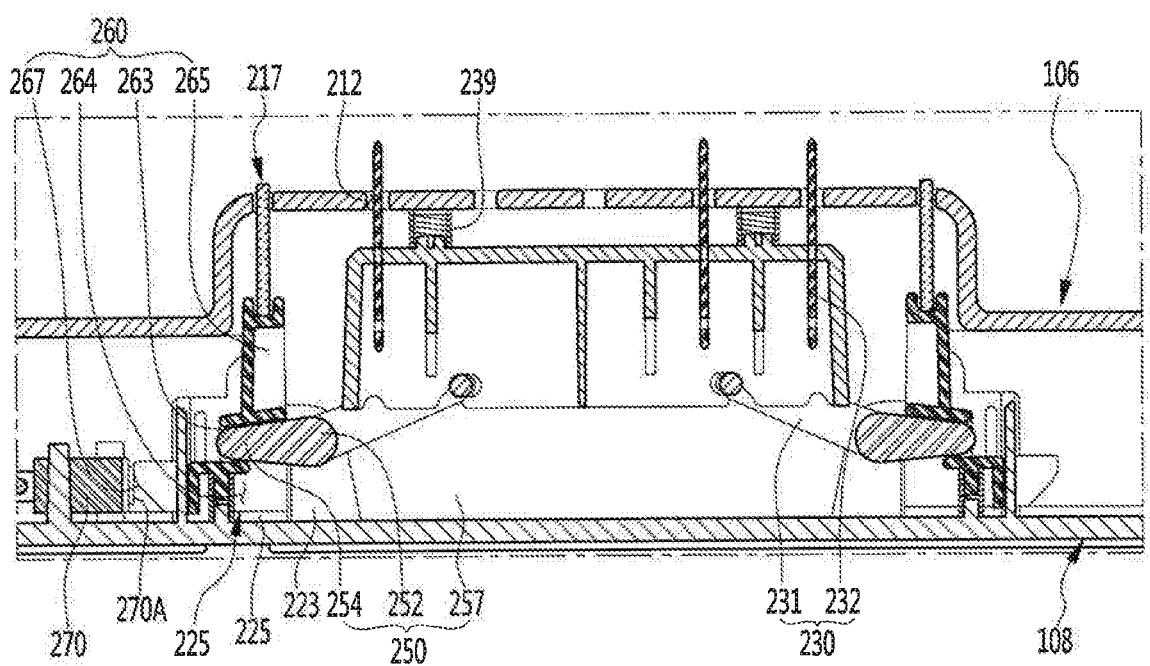
FIG. 24 is a cross-sectional view taken along line D-D of FIG. 23.

FIG. 22 is a cross-sectional view taken along line C-C of FIG. 16, FIG. 23 is a perspective view of the terminal body from which the output terminal is led out according to another embodiment, and FIG. 24 is a cross-sectional view taken along line D-D of FIG. 23.

Referring to FIGS. 22 to 24, in the state in which the battery pack 10 is not mounted on the charging device 100, the terminal body 230 may be disposed at a position (a first position) to which the terminal body 230 moves downward. That is, the terminal cover 210 covers the output terminal 232 to prevent the output terminal 232 from being exposed to the outside.

When the terminal body 230 moves to the first position, the terminal penetration part 212 defined in the top surface of the terminal cover 210 may be disposed above the output terminal 232.

In the state as illustrated in FIG. 22, since the output terminal 232 does not protrude outward from the terminal cover 210, the user may be prevented from coming into contact with the output terminal 232.

In the state as illustrated in FIG. 22, the operation rib 267 is spaced apart from the micro switch 270. In this case, since external force applied to the actuator 270A does not exist, the micro switch 270 may be maintained in OFF state. Thus, at least one of the plurality of output terminals 232 may be prevented from being connected to the power source unit.

That is, according to an embodiment, a risk of electric shock due to the user's contact with the output terminal 232 may be prevented from occurring through a double insulating structure of a first insulating structure for preventing the output terminal 232 from being exposed and a second insulating structure for maintaining the OFF state of the micro switch 270.

While the battery pack 10 is mounted on the upper case 106, the second pressing rib 37 of the battery pack 10 is inserted into the pressing rib penetration part 217 of the terminal cover 210. Here, the first recessed surface 31 may come into contact with the front surface of the terminal cover 210, and the second recessed surface 32 may come into contact with the top surface of the terminal cover 210.

The second pressing rib 37 may press the pressing rib support part 265 of the link 260 to move the link 260 downward. Here, the elastic member 280 provided in the elastic member accommodation part 264 of the link 260 is compressed.

While the link 260 moves downward, the operation rib 267 moves downward to press the actuator 270A of the micro switch 270. Thus, the micro switch 270 is turned on.

While the link 260 moves downward, the pressing part 254 accommodated in the lever accommodation part 263 of the link 260 moves downward.

While the pressing part 254 moves, the lever 250 rotates in one direction (in a counterclockwise direction with respect to the left lever of FIG. 24), and the elevation part 257 moves upward. Thus, the terminal body 230 coupled to the elevation part 257 moves upward.

While the terminal body 230 moves downward, the output terminal 232 disposed above the frame 231 passes through the terminal penetration part 212 to protrude upward from the terminal cover 210.

Here, the second recessed surface 32 of the battery unit 20 is seated on the top surface of the terminal cover 210, and the output terminal 232 protruding to the outside of the terminal cover 210 is inserted into the input terminal 35.

In the state in which the micro switch is turned on, and the output terminal 232 is inserted into the input terminal 35, the battery pack 10 is chargeable.

According to this embodiment, since the operation rib 267 presses the actuator 270A, power may be applied to the output terminal 232. Also, since the output terminal 232 protrudes upward from the terminal cover 210, the output terminal 232 may be electrically connected to the battery pack 10. Since the above-described two processes occur at the same time by one manipulation, user convenience may be improved.

Thus, when a peak voltage of the battery pack 10 is above about 42.4 V, the charging may be enabled in the charging device 100.

When the battery pack 10 is separated from the charging device 100, the link 260 moves upward by the elastic member 280, and also, the pressing part 254 accommodated in the lever accommodation part 263 moves upward. The lever 250 rotates in the other direction (in a clockwise direction with respect to the left lever of FIG. 22), and the elevation part 257 moves downward.

The terminal body 230 may move downward by the downward movement of the elevation part 257, and thus, the output terminal 232 may be led into the terminal cover 210. Thus, the output terminal 232 may be spaced a predetermined distance from the terminal penetration part 212.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging device comprising:
an output terminal unit connected to an input terminal unit of a battery pack, wherein the output terminal unit comprises:
a terminal body comprising an output terminal connected to the input terminal unit; and
a terminal cover which covers the output terminal before the input terminal unit of the battery pack is connected to the output terminal unit, and through which the output terminal passes while the input terminal unit of the battery pack is connected to the output terminal unit,
wherein a rib penetration part through which a pressing rib extending from the battery pack passes is defined in the terminal cover,
the output terminal unit further comprises a lever coupled to the terminal cover and that is selectively hooked with the terminal body, and
the lever is rotated by the pressing rib passing through the rib penetration part while the input terminal unit of the battery pack is connected to the output terminal unit which causes the hooked state of the lever with respect to the terminal body to be released.

2. The charging device according to claim 1, wherein the terminal cover comprises a terminal penetration part through which the output terminal passes.

3. The charging device according to claim 2, wherein, before the input terminal unit of the battery pack is connected to the output terminal unit, the output terminal is spaced apart from the terminal penetration part inside the terminal cover.

4. The charging device according to claim 3, wherein the output terminal unit further comprises an elastic member that elastically supports the terminal cover to maintain the state in which the output terminal is spaced apart from the terminal penetration part before the input terminal unit of the battery pack is connected to the output terminal unit.

5. The charging device according to claim 1, further comprising a holding unit on which the battery pack is seated, and the output terminal unit is disposed,
wherein the terminal body passes through the holding unit within the holding unit to protrude to the outside of the holding unit, and
the terminal cover covers the output terminal of the terminal body protruding to the outside of the holding unit.

6. The charging device according to claim 1, wherein the lever comprises:
a rotational shaft rotatably coupled to the terminal cover;
a first rib extending from the rotational shaft and hooked with the terminal body; and
a second rib extending from at least one of the rotational shaft and the first rib and pressed by the pressing rib while the input terminal unit of the battery pack is connected to the output terminal unit.

7. The charging device according to claim 6, wherein the terminal body further comprises:
a frame to which the output terminal is fixed;
a hook part disposed on the frame and hooked with the first rib; and
an insertion part defined in one side of the hook part.

8. The charging device according to claim 7, wherein the first rib is hooked with the hook part before the input terminal unit of the battery pack is connected to the output terminal unit, and
the lever is rotated by the pressing rib to allow the first rib to be inserted into the insertion part while the input terminal unit of the battery pack is connected to the output terminal unit.

9. The charging device according to claim 7, wherein the insertion part comprises:
a first insertion part into which the first rib is inserted; and
a second insertion part which extends from the first insertion part and into which the second rib is inserted,
wherein the hook part is disposed on each of both edges of the second insertion part.

10. A charging device comprising:
an output terminal unit connected to an input terminal unit of a battery pack,
wherein the output terminal unit comprises:
a terminal cover with a terminal penetration part;
a terminal body comprising a frame to which the output terminal passing through the terminal penetration part is fixed; and
a moving mechanism that is moved by the battery pack while the battery pack is mounted which moves the terminal body which causes the output terminal to pass through the terminal penetration part to selectively protrude to the outside of the terminal cover,
wherein the moving mechanism comprises:
a lever connected to the frame; and
a link pressed by the battery pack which operates the lever,
wherein the charging device further comprises a fixing unit comprising a link support part guiding vertical movement of the link and a lever fixing part to which the lever is rotatably coupled.

11. The charging device according to claim 10, wherein, in a state in which the battery pack is not mounted, the output terminal is spaced apart from the terminal penetration part.

12. The charging device according to claim 11, wherein the moving mechanism moves the terminal body upward while the battery pack is mounted which causes the output terminal to pass through the terminal penetration part to protrude upward from the terminal cover.

13. The charging device according to claim 10, wherein the frame comprises a guide part guiding vertical movement of the frame, and
the fixing unit comprises a terminal body support part disposed to correspond to the guide part and comprising a rib inserted into the guide part.

14. The charging device according to claim 10, wherein the link comprises:
a link body movable in a vertical direction; and
a guide part disposed on one surface of the link body,
wherein the link support part further comprises a sliding hole into which the guide part is inserted.

15. The charging device according to claim 10, wherein the lever comprises:
a main body comprising a rotational shaft;
a pressing part extending from the main body in one direction; and an elevation part extending from the main body in the other direction and connected to the frame.

16. The charging device according to claim 15, wherein the frame comprises a lever coupling part to which the elevation part is rotatably connected, and
    the lever coupling part comprises a curved portion having the same shape as a moving trajectory of the elevation part while the lever rotates which causes the frame to ascend without an interference between the elevation part and the frame while the lever rotates.

17. The charging device according to claim 15, wherein the link comprises:
    a lever accommodation part in which the pressing part is accommodated; and
    a pressing rib support part disposed on one side of the lever accommodation part to support a pressing rib of the battery pack.

18. The charging device according to claim 17, further comprising an elastic member elastically supporting the link and moving the frame downward when the battery pack is separated.

\* \* \* \* \*